(12) United States Patent
Shahana et al.

(10) Patent No.: US 12,162,565 B2
(45) Date of Patent: Dec. 10, 2024

(54) HUMAN-POWERED VEHICLE CONTROL DEVICE

(71) Applicant: Shimano Inc., Osaka (JP)

(72) Inventors: Satoshi Shahana, Osaka (JP); Kenji Tagawa, Osaka (JP)

(73) Assignee: Shimano Inc., Osaka (JP)

( * ) Notice: Subject to any disclaimer, the term of this patent is extended or adjusted under 35 U.S.C. 154(b) by 557 days.

(21) Appl. No.: 17/543,882

(22) Filed: Dec. 7, 2021

(65) Prior Publication Data

US 2022/0204128 A1    Jun. 30, 2022

(30) Foreign Application Priority Data

Dec. 25, 2020   (JP) ................................. 2020-216990

(51) Int. Cl.
| | |
|---|---|
| *B62M 6/50* | (2010.01) |
| *B62J 45/412* | (2020.01) |
| *B62J 45/413* | (2020.01) |
| *B62J 45/415* | (2020.01) |
| *B62M 25/08* | (2006.01) |

(52) U.S. Cl.
CPC .............. *B62M 6/50* (2013.01); *B62J 45/412* (2020.02); *B62J 45/413* (2020.02); *B62J 45/4151* (2020.02); *B62J 45/4152* (2020.02); *B62M 25/08* (2013.01)

(58) Field of Classification Search
CPC ............................. B62M 9/122; B62M 9/123
See application file for complete search history.

(56) References Cited

U.S. PATENT DOCUMENTS

| | | | | |
|---|---|---|---|---|
| 10,106,223 | B2 * | 10/2018 | Usui ........................ | B62M 6/55 |
| 10,167,056 | B2 * | 1/2019 | Hashimoto ............ | B62M 9/123 |
| 10,988,208 | B2 * | 4/2021 | Shahana ................ | B62M 25/08 |
| 11,584,478 | B2 * | 2/2023 | Shahana ................ | B62M 9/133 |
| 11,807,336 | B2 * | 11/2023 | Shahana ................. | B62M 6/45 |
| 11,964,731 | B2 * | 4/2024 | Hahn ..................... | B62M 9/132 |

(Continued)

FOREIGN PATENT DOCUMENTS

| | | |
|---|---|---|
| DE | 101 53 487 A1 | 5/2003 |
| JP | 10-511621 A | 11/1998 |

*Primary Examiner* — Kevin Hurley
*Assistant Examiner* — Hosam Shabara
(74) *Attorney, Agent, or Firm* — Global IP Counselors, LLP

(57) ABSTRACT

A human-powered vehicle control device is provided for controlling a human-powered vehicle. The human-powered vehicle control device includes an electronic controller that controls a human-powered vehicle component in accordance with a control state including first and second modes. The electronic controller changes a transmission ratio of a transmission device in accordance with a first shifting condition in the first mode, and changes the transmission ratio in accordance with a second shifting condition in the second mode. The electronic controller changes the first shifting condition in accordance with a converging reference value, which is related to a traveling state of the human-powered vehicle, for a case where the human-powered vehicle is in a riding converging state in the first mode, and changes the second shifting condition in accordance with a converging reference value for a case where the human-powered vehicle is in the riding converging state in the second mode.

21 Claims, 13 Drawing Sheets

(56) References Cited

U.S. PATENT DOCUMENTS

| | | |
|---|---|---|
| 12,005,994 B2 * | 6/2024 | Hahn ................... B62M 9/123 |
| 2017/0001687 A1 | 1/2017 | Usui et al. |
| 2022/0204128 A1 * | 6/2022 | Shahana .............. B62J 45/4152 |

* cited by examiner

HUMAN-POWERED VEHICLE CONTROL DEVICE

CROSS-REFERENCE TO RELATED APPLICATIONS

This application claims priority to Japanese Patent Application No. 2020-216990, filed on Dec. 25, 2020. The entire disclosures of Japanese Patent Application No. 2020-216990 is hereby incorporated herein by reference.

BACKGROUND

Technical Field

The present disclosure generally relates to a human-powered vehicle control device for a human-powered vehicle.

Background Information

Japanese National Phase Laid-Open Patent Publication No. 10-511621 (Patent Document 1) discloses an example of a transmission system that controls a transmission device in accordance with a traveling state of a human-powered vehicle.

SUMMARY

One objective of the present disclosure is to provide a human-powered vehicle control device that controls a transmission device of a human-powered vehicle in a preferred manner.

A human-powered vehicle control device in accordance with a first aspect of the present disclosure is for a human-powered vehicle. The human-powered vehicle includes a transmission device that changes a transmission ratio, which is a ratio of a rotational speed of a wheel to a rotational speed of a crank axle. The human-powered vehicle control device comprises an electronic controller configured to control the transmission device. The electronic controller is configured to actuate the transmission device to change the transmission ratio in accordance with a shifting condition including a first shifting condition and a second shifting condition. The electronic controller is configured to control a component of the human-powered vehicle in accordance with a control state including a first mode and a second mode that differs from the first mode. The electronic controller is configured to actuate the transmission device to change the transmission ratio in accordance with the first shifting condition in a case where the control state is the first mode. The electronic controller is configured to actuate the transmission device to change the transmission ratio in accordance with the second shifting condition in a case where the control state is the second mode. The electronic controller is configured to change the first shifting condition in accordance with a converging reference value, which is a reference value related to a traveling state of the human-powered vehicle, for a case where the control state is the first mode and the human-powered vehicle is in a riding converging state. The electronic controller is configured to change the second shifting condition in accordance with a converging reference value, which is the reference value, for a case where the control state is the second mode and the human-powered vehicle is in the riding converging state. The human-powered vehicle control device according to the first aspect changes the shifting conditions of the first mode and the second mode in accordance with the respective converging reference values for the first mode and the second mode. Thus, the transmission device of the human-powered vehicle is controlled in a preferred manner.

In accordance with a second aspect of the present disclosure, the human-powered vehicle control device according to the first aspect is configured so that the component includes a motor that applies a propulsion force to the human-powered vehicle. The first mode and the second mode differ from each other in at least one of an assist level of the motor, a maximum value of an output of the motor, the output of the motor, and a response speed of the output of the motor with respect to human driving force input to the human-powered vehicle. The human-powered vehicle control device according to the second aspect controls the transmission device in accordance with a shifting condition suitable for each of the first mode and the second mode that differ from each other in at least one of the assist level of the motor, the maximum value of the output of the motor, the output of the motor, and the response speed of the output of the motor with respect to human driving force input to the human-powered vehicle.

In accordance with a third aspect of the present disclosure, the human-powered vehicle control device according to the first or second aspect is configured so that the component includes the transmission device. The human-powered vehicle control device according to the third aspect controls the transmission device in accordance with the first mode and the second mode.

In accordance with a fourth aspect of the present disclosure, the human-powered vehicle control device according to any one of the first to third aspects is configured so that the electronic controller is configured to switch the first mode and the second mode in accordance with at least one of model of the human-powered vehicle and size of a wheel of the human-powered vehicle. The human-powered vehicle control device according to the fourth aspect controls the transmission device in accordance with a shifting condition suitable for each of the first mode and the second mode that correspond to at least one of model of the human-powered vehicle and size of the wheel of the human-powered vehicle.

In accordance with a fifth aspect of the present disclosure, the human-powered vehicle control device according to any one of the first to fourth aspects is configured so that the shifting condition is set for each kinetic state of the human-powered vehicle. The human-powered vehicle control device according to the fifth aspect changes the shifting condition that is set for each kinetic state of the human-powered vehicle in accordance with the converging reference value for the kinetic state.

A human-powered vehicle control device in accordance with a sixth aspect of the present disclosure is for a human-powered vehicle. The human-powered vehicle includes a transmission device that changes a transmission ratio, which is a ratio of a rotational speed of a wheel to a rotational speed of a crank axle. The human-powered vehicle control device comprises an electronic controller configured to control the transmission device. The electronic controller is configured to actuate the transmission device to change the transmission ratio in accordance with a shifting condition including a third shifting condition and a fourth shifting condition. The electronic controller is configured to actuate the transmission device to change the transmission ratio in accordance with the third shifting condition in a case where a kinetic state of the human-powered vehicle is a first kinetic state. The electronic controller is configured to actuate the transmission device to change the transmission ratio in accordance with the fourth shifting condition in a case where the kinetic state of the human-powered vehicle is a second kinetic state that differs from the first kinetic state. The electronic controller is configured to change the third shifting condition in accordance with a converging reference value, which is a reference value related to a traveling state of the human-powered vehicle, for a case where the kinetic state of the human-powered vehicle is the first kinetic state and the human-powered vehicle is in a riding converging state. The electronic controller is configured to change the fourth shifting condition in accordance with a converging reference value, which is the reference value, for a case where the kinetic state of the human-powered vehicle is the second kinetic state and the human-powered vehicle is in the riding converging state. The human-powered vehicle control device according to the sixth aspect changes the shifting conditions of the first kinetic state and the second kinetic state in accordance with the respective converging reference values for the first kinetic state and the second kinetic state. Thus, the transmission device of the human-powered vehicle is controlled in a preferred manner.

In accordance with a seventh aspect of the present disclosure, the human-powered vehicle control device according to the fifth or sixth aspect is configured so that the kinetic state includes a human driving force input to the human-powered vehicle. The human-powered vehicle control device according to the seventh aspect controls the transmission device in accordance with a shifting condition suitable for each kinetic state corresponding to human driving force input to the human-powered vehicle.

In accordance with an eighth aspect of the present disclosure, the human-powered vehicle control device according to any one of the fifth seventh aspects is configured so that the kinetic state includes a tilt of the human-powered vehicle. The human-powered vehicle control device according to the eighth aspect controls the transmission device in accordance with a shifting condition suitable for each kinetic state corresponding to tilt of the human-powered vehicle.

In accordance with a ninth aspect of the present disclosure, the human-powered vehicle control device according to the eighth aspect is configured so that the electronic controller is configured to change the shifting condition in accordance with a parameter related to the tilt of the human-powered vehicle. The parameter includes at least one of an acceleration of the human-powered vehicle, a pitch angle of the human-powered vehicle, a roll angle of the human-powered vehicle, and a yaw angle of the human-powered vehicle. The human-powered vehicle control device according to the ninth aspect controls the transmission device in accordance with a shifting condition suitable for each kinetic state corresponding to at least one of an acceleration of the human-powered vehicle, a pitch angle of the human-powered vehicle, a roll angle of the human-powered vehicle, and a yaw angle of the human-powered vehicle.

In accordance with a tenth aspect of the present disclosure, the human-powered vehicle control device according to any one of the first to ninth aspects is configured so that the electronic controller is configured to change the shifting condition in accordance with a comfort level of a rider. The human-powered vehicle control device according to the tenth aspect changes the shifting condition in accordance with a comfort level of a rider.

In accordance with an eleventh aspect of the present disclosure, the human-powered vehicle control device according to the tenth aspect is configured so that the electronic controller is configured to change the shifting condition in accordance with the comfort level of the rider that is input by operating a first operation portion. The human-powered vehicle control device according to the eleventh aspect changes the shifting condition in accordance with a comfort level of a rider that is input by operating the first operation portion. Thus, the shifting condition is appropriately changed as intended by the rider.

In accordance with a twelfth aspect of the present disclosure, in the human-powered vehicle control device according to the tenth aspect, the electronic controller is configured to change the shifting condition in accordance with an output of a detector that detects the comfort level of the rider. The human-powered vehicle control device according to the twelfth aspect changes the shifting condition in accordance with a comfort level of a rider detected based on an output of the detector. This improves convenience.

In accordance with a thirteenth aspect of the present disclosure, in the human-powered vehicle control device according to any one of the first to twelfth aspects, the electronic controller is configured to change the shifting condition in a case where a second operation portion is operated. The human-powered vehicle control device according to the thirteenth aspect changes the shifting condition in accordance with an operation performed on the second operation portion. Thus, the intention of the rider is reflected on the shifting condition.

In accordance with a fourteenth aspect of the present disclosure, the human-powered vehicle control device according to any one of the first to thirteenth aspects is configured so that the converging reference value includes a first converging reference value and a second converging reference value, which is related to a force applied to a crank of the human-powered vehicle in a case where the human-powered vehicle is in a riding converging state. The electronic controller is configured to change the shifting condition in accordance with the first converging reference value and the second converging reference value. The human-powered vehicle control device according to the fourteenth aspect changes the shifting condition in accordance with the first converging reference value and the second converging reference value.

In accordance with a fifteenth aspect of the present disclosure, the human-powered vehicle control device according to any one of the first to fourteenth aspects is configured so that the electronic controller is configured to calculate the converging reference value in accordance with a moving average or variance of the reference value. The human-powered vehicle control device according to the fifteenth aspect calculates the converging reference value in accordance with a moving average or variance of the reference value. This reduces the effect of momentary variations in the reference value.

In accordance with a sixteenth aspect of the present disclosure, the human-powered vehicle control device according to any one of the first to fifteenth aspects is configured so that the reference value includes a value related to a rotational speed of the crank axle. The human-powered vehicle control device according to the sixteenth aspect changes the shifting condition in accordance with the value related to the rotational speed of the crank axle.

In accordance with a seventeenth aspect of the present disclosure, the human-powered vehicle control device according to the sixteenth aspect is configured so that the value related to the rotational speed of the crank axle includes a rotational amount of the crank axle or a rotational angle of the crank axle. The human-powered vehicle control device according to the seventeenth aspect changes the shifting condition in accordance with the rotational amount of the crank axle or the rotational angle of the crank axle.

In accordance with an eighteenth aspect of the present disclosure, the human-powered vehicle control device according to any one of the first to seventeenth aspects is configured so that the shifting condition includes a value related to the rotational speed of the crank axle. The human-powered vehicle control device according to the eighteenth aspect changes the shifting condition in accordance with the value related to the rotational speed of the crank axle.

In accordance with a nineteenth aspect of the present disclosure, the human-powered vehicle control device according to the eighteenth aspect is configured so that the shifting condition is satisfied in a case where the rotational speed of the crank axle is excluded from a predetermined range. The electronic controller changes the predetermined range in accordance with the converging reference value to change the shifting condition. The human-powered vehicle control device according to the nineteenth aspect changes the predetermined range in accordance with the converging reference value to appropriately change the shifting condition.

In accordance with a twentieth aspect of the present disclosure, the human-powered vehicle control device according to any one of the first to nineteenth aspects is configured so that the case where the human-powered vehicle is in the riding converging state is a case where the rotational speed of the crank axle is included in a first range. The human-powered vehicle control device according to the twentieth aspect changes the shifting condition in accordance with a converging reference value for a case where the rotational speed of the crank axle is included in the first range.

In accordance with a twenty-first aspect of the present disclosure, the human-powered vehicle control device according to any one of the first to twentieth aspects further comprises a storage configured to store information related to the shifting condition that has been changed. The human-powered vehicle control device according to the twenty-first aspect stores information related to the shifting condition that has been changed. The changed shifting condition can be used from the next time the human-powered vehicle travels.

The human-powered vehicle control device according to the present disclosure controls the transmission device of a human-powered vehicle in a preferred manner.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the human-powered vehicle field from this disclosure that the following descriptions of the embodiments are provided for illustration only and not for the purpose of limiting the invention as defined by the appended claims and their equivalents.

First Embodiment

Figure 1:
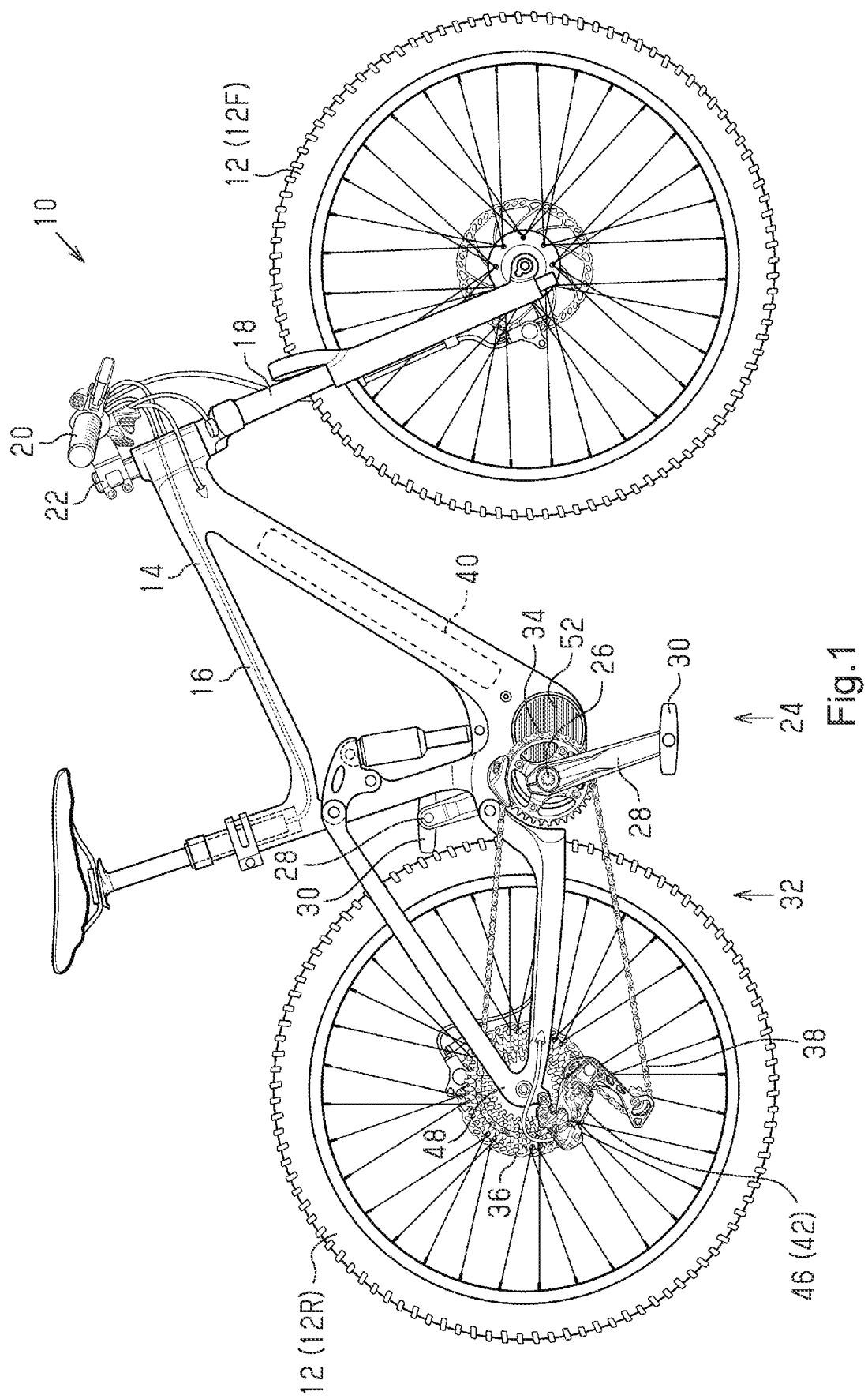
FIG. 1 is a side elevational view of a human-powered vehicle including a human-powered vehicle control device in accordance with a first embodiment.

A first embodiment of a human-powered vehicle control device 70 for a human-powered vehicle will now be described with reference to FIGS. 1 to 9. FIG. 1 shows a human-powered vehicle 10 related to the human-powered vehicle control device 70. The human-powered vehicle 10 is a vehicle including at least one wheel 12 and driven by at least a human driving force. The human-powered vehicle 10 includes, for example, various types of bicycles such as a mountain bike, a road bike, a city bike, a cargo bike, a hand bike, and a recumbent bike. The number of wheels 12 on the human-powered vehicle 10 is not limited. The human-powered vehicle 10 includes, for example, a monocycle and a vehicle including three or more wheels 12. The human-powered vehicle 10 is not limited to a vehicle configured to be driven only by a human driving force. The human-powered vehicle 10 includes an E-bike that uses driving force of an electric motor in addition to a human driving force for propulsion. The E-bike includes an electric assist bicycle that assists in propulsion with an electric motor. In the embodiments described below, the human-powered vehicle 10 refers to a bicycle.

The human-powered vehicle 10 includes the wheel 12 and a vehicle body 14. The wheel 12 includes a front wheel 12F and a rear wheel 12R. The vehicle body 14 includes a frame 16 and a front fork 18. A handlebar 20 is coupled to the front fork 18 by a stem 22.

In this specification, the frame of reference for specifying terms indicating a direction, that is, "front," "rear," "frontward," "rearward," "left," "right," "sideward," "upward," "downward," and any other similar direction-indicating terms is an occupant who is at a standard position (e.g., on saddle or seat) of the human-powered vehicle 10 facing the handlebar 20.

The human-powered vehicle 10 further includes a crank 24 into which human driving force is input. The crank 24 includes a crank axle 26 configured to rotate relative to the frame 16 and a pair of crank arms 28 provided on opposite axial ends of the crank axle 26. Two pedals 30 are respectively coupled to the crank arms 28.

In the present embodiment, the drive wheel is the rear wheel 12R. The rear wheel 12R is driven in accordance with rotation of the crank 24. The crank 24 is coupled to the rear wheel 12R by a drive mechanism 32. The drive mechanism 32 includes a first rotary body 34 coupled to the crank axle 26. The crank axle 26 and the first rotary body 34 can be coupled so as to rotate integrally with each other or can be coupled via a first one-way clutch. The first one-way clutch is configured to rotate the first rotary body 34 forward in a case where the crank 24 rotates forward and allow the first rotary body 34 to rotate relative to the crank 24 in a case where the crank 24 rotates rearward. The first rotary body 34 includes a sprocket, a pulley, or a bevel gear.

The drive mechanism 32 further includes a second rotary body 36 and a linking member 38. The linking member 38 transmits rotational force of the first rotary body 34 to the second rotary body 36. The linking member 38 includes, for example, a chain, a belt, or a shaft.

The second rotary body 36 is coupled to the rear wheel 12R. The second rotary body 36 includes a sprocket, a pulley, or a bevel gear. Preferably, a second one-way clutch is provided between the second rotary body 36 and the rear wheel 12R. The second one-way clutch is configured to rotate the rear wheel 12R forward in a case where the second rotary body 36 rotates forward and allow the rear wheel 12R to rotate relative to the second rotary body 36 in a case where the second rotary body 36 rotates rearward. In the present embodiment, the rear wheel 12R is coupled to the crank 24 by the drive mechanism 32. However, any one of the rear wheel 12R and the front wheel 12F can be coupled to the crank 24 by the drive mechanism 32.

The human-powered vehicle 10 further includes a battery 40. The battery 40 includes one or more battery elements. The battery elements include a rechargeable battery. The battery 40 is configured to supply electric power to the human-powered vehicle control device 70. Preferably, the battery 40 is connected to an electronic controller 72 (refer to FIG. 2) by an electric cable or a wireless communication device to communicate with the electronic controller 72. The battery 40 is configured to communicate with the electronic controller 72 through, for example, power line communication (PLC), a controller area network (CAN), or a universal asynchronous receiver/transmitter (UART).

The human-powered vehicle 10 includes a transmission device 42 that changes a transmission ratio, which is a ratio of a rotational speed of a wheel 12 to a rotational speed of the crank axle 26. Preferably, the transmission ratio is a ratio of a rotational speed of the drive wheel to a rotational speed of the crank axle 26.

The transmission device 42 are actuated by electric power supplied from the battery 40 or a dedicated power supply mounted on the transmission device 42. The transmission device 42 includes, for example, at least one of a front derailleur, a rear derailleur 46, and an internal shifting device. The transmission device 42 can be configured to be actuated by an actuator. The actuator includes an electric actuator. The actuator includes, for example, a motor.

In a case where the transmission device 42 includes the rear derailleur 46, the rear derailleur 46 is provided on a rear end 48 of the frame 16. In a case where the transmission device 42 includes the rear derailleur 46, the drive mechanism 32 includes a plurality of the second rotary bodies 36. The rear derailleur 46 is driven to change the second rotary body 36 on which the linking member 38 runs from one second rotary body 36 to another second rotary body 36 to change the transmission ratio of the human-powered vehicle 10.

In a case where the transmission device 42 includes an internal shifting device, the internal shifting device is provided, for example, on a hub of the rear wheel 12R. The transmission device 42 can include a stepless shifting device.

The human-powered vehicle 10 further includes a human-powered vehicle component 50. The component 50 includes a motor 52 that applies a propulsion force to the human-powered vehicle 10. Thus, the motor 52 constitutes an assist motor. The component 50 can include the transmission device 42.

The motor 52 includes one or more electric motors. The electric motor is, for example, a brushless motor. The motor 52 is configured to transmit a rotational force to at least one of the front wheel 12F and a power transmission path of a human driving force extending from the pedals 30 to the rear wheel 12R. The power transmission path of the human driving force extending from the pedals 30 to the rear wheel 12R includes the rear wheel 12R.

In the present embodiment, the motor 52 is provided on the frame 16 of the human-powered vehicle 10 and is configured to transmit a rotational force to the first rotary body 34. In a case where the motor 52 is provided on at least one of the front wheel 12F and the rear wheel 12R, the motor 52 can be provided on a hub and form a hub motor together with the hub.

Figure 2:
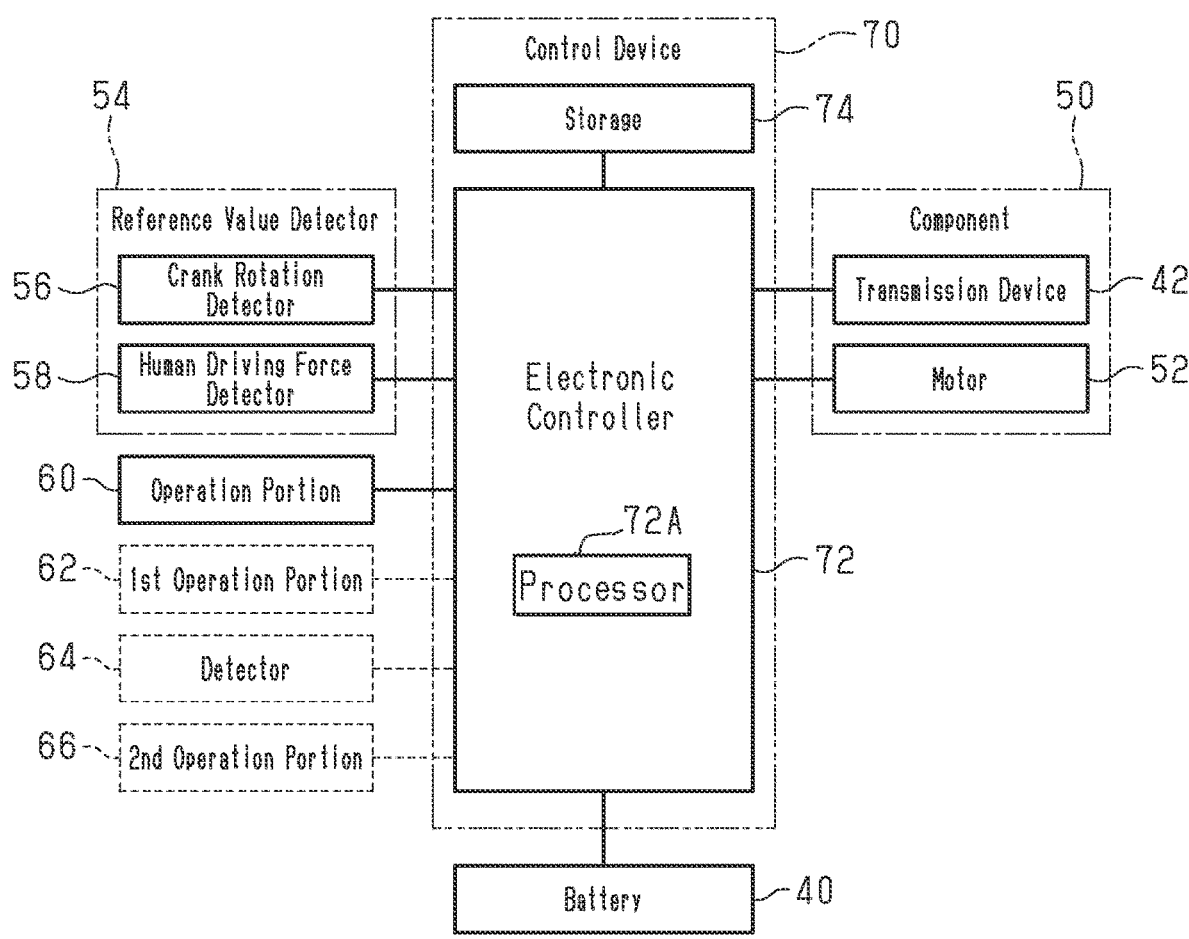
FIG. 2 is a block diagram showing the electrical configuration of the human-powered vehicle control device of the first embodiment.

As shown in FIG. 2, the human-powered vehicle 10 further includes a reference value detector 54. The term "detector" as used herein refers to a hardware device or instrument designed to detect the presence or absence of a particular event, object, substance, or a change in its environment, and to emit a signal in response. The term "detector" as used herein does not include a human. The reference value detector 54 is configured to detect a reference value RV related to a traveling state of the human-powered vehicle 10. The reference value RV includes at least one of a first reference value RV1 and a second reference value RV2. Preferably, the reference value RV includes both the first reference value RV1 and the second reference value RV2. Preferably, the reference value RV includes a value related to a rotational speed of the crank axle 26. Preferably, the first reference value RV1 relates to a rotational speed of the crank axle 26. The second reference value RV2 relates to a force applied to the crank 24 of the human-powered vehicle 10. The first reference value RV1 is, for example, a cadence of the human-powered vehicle 10. The second reference value RV2 is, for example, a torque applied to the crank 24 by a human driving force.

In a case where the reference value RV includes the first reference value RV1, the reference value detector 54 includes a crank rotation detector 56. In a case where the reference value RV includes the second reference value RV2, the reference value detector 54 includes a human driving force detector 58.

The crank rotation detector 56 is configured to detect rotation of the crank axle 26. The crank rotation detector 56 is provided, for example, on the frame 16 of the human-powered vehicle 10. The crank rotation detector 56 includes a magnetic sensor that outputs a signal corresponding to the strength of the magnetic field. The magnetic sensor includes an annular magnet in which the strength of the magnetic field varies in the circumferential direction. The magnet is provided on the crank axle 26, a member that rotates in cooperation with the crank axle 26, or the power transmission path between the crank axle 26 and the first rotary body 34. The member that rotates in cooperation with the crank axle 26 can include the output shaft of the motor 52.

The crank rotation detector 56 outputs a signal corresponding to rotation of the crank axle 26. For example, in a case where the first one-way clutch is not provided between the crank axle 26 and the first rotary body 34, the magnet can be provided on the first rotary body 34. The crank rotation detector 56 can have any configuration that obtains the first reference value RV1 and can include an optical sensor, an acceleration sensor, a gyro sensor, or a torque sensor instead of a magnetic sensor. The term "sensor" as used herein refers to a hardware device or instrument designed to detect the presence or absence of a particular event, object, substance, or a change in its environment, and to emit a signal in response. The term "sensor" as used herein does not include a human.

The human driving force detector 58 is configured to detect a torque applied to the crank 24 by a human driving force. The human driving force detector 58 is provided, for example, on the frame 16 of the human-powered vehicle 10, the crank 24, or the pedals 30. The human driving force detector 58 is configured to output a signal corresponding to the second reference value RV2.

The human driving force detector 58 includes, for example, a torque sensor. The torque sensor is configured to output a signal corresponding to a torque applied to the crank 24 by a human driving force. In a case where the first one-way clutch is provided on the power transmission path, it is preferred that the torque sensor is provided at the upstream side of the first one-way clutch in the power transmission path. The torque sensor includes, for example, a strain sensor, a magnetostrictive sensor, or a pressure sensor. The strain sensor includes a strain gauge.

The torque sensor is provided in the power transmission path or the vicinity of a member included in the power transmission path. The member included in the power transmission path is, for example, the crank axle 26, a member that transmits a human driving force between the crank axle 26 and the first rotary body 34, the crank arms 28, and the pedals 30. The human driving force detector 58 can have any configuration that obtains information related to a human driving force and can include, for example, a sensor that detects pressure applied to the pedals 30 or a sensor that detects tension of the linking member 38.

The human-powered vehicle 10 further includes an operation portion 60. The operation portion 60 is provided, for example, on the handlebar 20. The transmission device 42 is configured to be actuated to change the transmission ratio in accordance with an operation performed on the operation portion 60. The operation portion 60 can include an upshifting operation portion and a downshifting operation portion. In a case where the rider operates the upshifting operation portion, the transmission device 42 is actuated to increase the transmission ratio. In a case where the rider operates the downshifting operation portion, the transmission device 42 is actuated to decrease the transmission ratio.

The human-powered vehicle control device 70 includes the electronic controller 72. The electronic controller 72 includes at least one processor 72A that executes a predetermined control program. The processor 74A includes, for example, a central processing unit (CPU) or a micro processing unit (MPU). The processor 74A can include parts provided at positions separate from each other. The electronic controller 72 can include one or more microcomputers. Thus, the term "electronic controller" as used herein refers to hardware that executes a software program, and does not include a human. The electronic controller 72 is actuated by electric power supplied from the battery 40. The electronic controller 72 is connected to the crank rotation detector 56, the human driving force detector 58, and the operation portion 60 by a wireless communication device or an electric cable.

The human-powered vehicle control device 70 further includes storage 74. The storage 74 includes, for example, a nonvolatile memory and a volatile memory. The nonvolatile memory includes any computer storage device or any non-transitory computer-readable medium with the sole exception of a transitory, propagating signal. For example, the storage 74 includes at least one of a read-only memory (ROM), an erasable programmable read only memory (EPROM), an electrically erasable programmable read-only memory (EEPROM), and a flash memory. The volatile memory includes, for example, a random access memory (RAM). The storage 74 stores information used in various control processes and various control programs.

The electronic controller 72 controls the transmission device 42. The electronic controller 72 drives the actuator of the transmission device 42 in accordance with an operation performed on the operation portion 60 so that the transmission device 42 is actuated to change the transmission ratio. In a case where a shifting condition is satisfied, the electronic controller 72 actuates the transmission device 42 to change the transmission ratio of the human-powered vehicle 10.

Preferably, the electronic controller 72 controls the transmission device 42 in accordance with a control state. The control state includes a first control state and a second control state that differs from the first control state. In a case where the control state is the first control state, the electronic controller 72 actuates the transmission device 42 to change the transmission ratio in accordance with the shifting condition. Preferably, in a case where the control state is the first control state, the electronic controller 72 actuates the transmission device 42 to change the transmission ratio in accordance with a shifting condition including the reference value RV related to the traveling state of the human-powered vehicle 10. In a case where the control state is the second control state, the electronic controller 72 actuates the transmission device 42 to change the transmission ratio in accordance with an operation performed on the operation portion 60. The electronic controller 72 can be configured to actuate the transmission device 42 to change the transmission ratio in accordance with an operation performed on the operation portion 60 in a case where the control state is the first control state.

The electronic controller 72 includes at least one shifting condition. The electronic controller 72 actuates the transmission device 42 to change the transmission ratio in accordance with a shifting condition including the reference value RV related to the traveling state of the human-powered vehicle 10. The shifting condition including the reference value RV refers to a condition in which the shifting condition relates to the reference value RV. For example, the shifting condition includes a value related to rotational speed of the crank axle 26.

Preferably, the shifting condition is satisfied in a case where the reference value RV is excluded from a predetermined range. Preferably, the shifting condition is satisfied in a case where the first reference value RV1 is excluded from the predetermined range. Preferably, the shifting condition is satisfied in a case where rotational speed of the crank axle 26 is excluded from the predetermined range. For example, in a case where the rotational speed of the crank axle 26 is greater than the predetermined range, the electronic controller 72 controls the transmission device 42 to increase the transmission ratio. For example, in a case where the rotational speed of the crank axle 26 is less than the predetermined range, the electronic controller 72 controls the transmission device 42 to decrease the transmission ratio.

In the present embodiment, the electronic controller 72 changes the shifting condition in accordance with a converging reference value CRV, that is, a reference value RV for a case where the human-powered vehicle 10 is in a riding converging state. Preferably, the storage 74 is configured to store information related to the shifting condition that has been changed. For example, in a case where the human-powered vehicle 10 is powered on and the control state is the first control state, the electronic controller 72 controls the transmission device 42 using the shifting condition stored in the storage 74. In other words, the riding converging state refers to a non-transitional traveling state of the human-powered vehicle 10, that is, a state in which the human-powered vehicle 10 is stably traveling.

Preferably, the converging reference value CRV includes a first converging reference value CRV1, that is, a first reference value RV1 for a case where the human-powered vehicle 10 is in the riding converging state, and a second converging reference value CRV2, that is, a second reference value RV2 for a case where the human-powered vehicle 10 is in the riding converging state. Preferably, the electronic controller 72 changes the shifting condition in accordance with at least one of the first converging reference value CRV1, which is related to the rotational speed of the crank axle 26 in a case where the human-powered vehicle 10 is in the riding converging state, and the second converging reference value CRV2, which is related to a force applied to the crank 24 of the human-powered vehicle 10 in a case where the human-powered vehicle 10 is in the riding converging state. Preferably, the electronic controller 72 is configured to change the shifting condition in accordance with the first converging reference value CRV1 and the second converging reference value CRV2.

Preferably, the first converging reference value CRV1 is a converging value of the rotational speed of the crank axle 26 in a case where the human-powered vehicle 10 is in the riding converging state. Preferably, the second converging reference value CRV2 is a converging value of a torque applied to the crank 24 by the rider of the human-powered vehicle 10 in a case where the human-powered vehicle 10 is in the riding converging state.

Preferably, the electronic controller 72 does not change the shifting condition in accordance with the converging reference value CRV during at least one of a first period from when the human-powered vehicle 10 starts to travel and a second period from when the transmission device 42 performs shifting. Preferably, the electronic controller 72 does not change the shifting condition in accordance with the converging reference value CRV during a third period immediate before the transmission device 42 performs shifting instead of or in addition to at least one of the first period from when the human-powered vehicle 10 starts to travel and the second period from when the transmission device 42 performs shifting. For example, in a case where it is determined that the human-powered vehicle 10 is in the riding converging state during at least one of the first period from when the human-powered vehicle 10 starts to travel, the second period from when the transmission device 42 performs shifting, and the third period immediately before the transmission device 42 performs shifting, the electronic controller 72 does not change the shifting condition in accordance with the converging reference value CRV corresponding to the period. For example, during at least one of the first period from when the human-powered vehicle 10 starts to travel, the second period from when the transmission device 42 performs shifting, and the third period immediately before the transmission device 42 performs shifting, the electronic controller 72 can determine that the human-powered vehicle 10 is not in the riding converging state and be configured not to calculate the converging reference value CRV based on the reference value RV during the period.

Preferably, the case where the human-powered vehicle 10 is in the riding converging state is a case where the rotational speed of the crank axle 26 is included in a first range A1. The case where the human-powered vehicle 10 is in the riding converging state is a case where the rotational speed of the crank axle 26 is included in a second range A2. The first range A1 and the second range A2 are the same range. In the description of the present embodiment, the first reference value RV1 refers to the rotational speed of the crank axle 26.

The process for determining the riding converging state of the human-powered vehicle 10 executed by the electronic controller 72 will now be described with reference to FIGS. 3 and 4. In a case where electric power is supplied to the electronic controller 72, the electronic controller 72 starts the process and proceeds to step S11 of the flowchart shown in FIG. 3. In a case where the flowchart shown in FIG. 3 ends, the electronic controller 72 repeats the process from step S11 after a predetermined interval until the supply of electric power is stopped.

In step S11, the electronic controller 72 obtains the first reference value RV1 over a first predetermined period TN1. In step S11, the electronic controller 72 obtains a maximum value MA1 and a minimum value MB1 from the obtained first reference value RV1 in the first predetermined period TN1 and then proceeds to step S12.

In step S12, the electronic controller 72 calculates a difference between the maximum value MA1 and the minimum value MB1 and determines whether the difference between the maximum value MA1 and the minimum value MB1 is excluded from the first range A1. In a case where the difference between the maximum value MA1 and the minimum value MB1 is excluded from the first range A1, the electronic controller 72 proceeds to step S13. In step S13, the electronic controller 72 determines that the human-powered vehicle 10 is not in the riding converging state and then ends the process.

In step S12, the difference between the maximum value MA1 and the minimum value MB1 is included in the first range A1, the electronic controller 72 proceeds to step S14. In step S14, the electronic controller 72 obtains the first reference value RV1 until a second predetermined period TN2, which is longer than the first predetermined period TN1, ends. In step S14, the electronic controller 72 obtains a maximum value MA2 and a minimum value MB2 of the first reference value RV1 in the second predetermined period TN2 and then proceeds to step S15.

In step S15, the electronic controller 72 calculates a difference between the maximum value MA2 and the minimum value MB2 and determines whether the difference between the maximum value MA2 and the minimum value MB2 is excluded from the first range A1. In a case where the difference between the maximum value MA2 and the minimum value MB2 is excluded from the first range A1, the electronic controller 72 proceeds to step S13. In step S13, the electronic controller 72 determines that the human-powered vehicle 10 is not in the riding converging state and then ends the process.

In step S15, in a case where the difference between the maximum value MA2 and the minimum value MB2 is included in the first range A1, the electronic controller 72 proceeds to step S16. In step S16, the electronic controller 72 obtains the first reference value RV1 until a predetermined third period TN3, which is longer than the second predetermined period TN2, ends. In step S16, the electronic controller 72 obtains a maximum value MA3 and a minimum value MB3 of the first reference value RV1 in the predetermined third period TN3 and then proceeds to step S17.

In step S17, the electronic controller 72 calculates a difference between the maximum value MA3 and the minimum value MB3 and determines whether the difference between the maximum value MA3 and the minimum value MB3 is excluded from the first range A1. In a case where the difference between the maximum value MA3 and the minimum value MB3 is excluded from the first range A1, the electronic controller 72 proceeds to step S13. In step S13, the electronic controller 72 determines that the human-powered vehicle 10 is not in the riding converging state and then ends the process.

In step S17, in a case where the difference between the maximum value MA3 and the minimum value MB3 is included in the first range A1, the electronic controller 72 proceeds to step S18. In step S18, the electronic controller 72 determines that the human-powered vehicle 10 is in the riding converging state and then ends the process.

Figure 4:
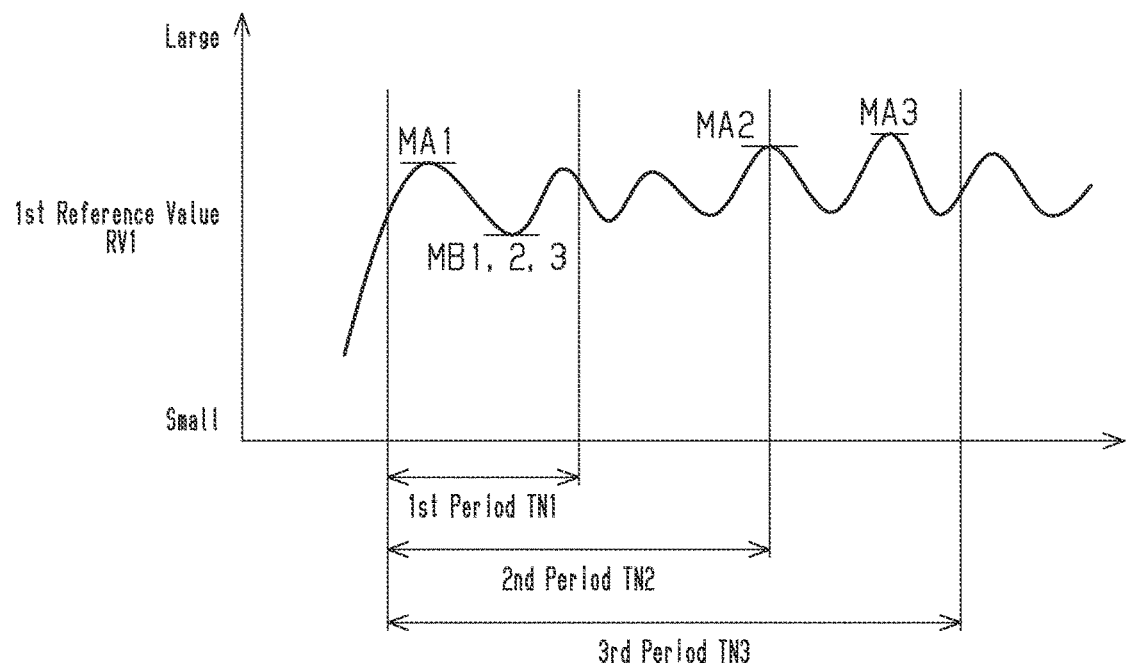
FIG. 4 is a chart showing changes in rotational speed of a crank axle.

As shown in FIG. 4, the electronic controller 72 defines a state in which the difference between the maximum value MA and the minimum value MB is included in the first range A1 over the predetermined third period TN3 as the riding converging state. In the riding converging state, the electronic controller 72 obtains the first converging reference value CRV1 and the second converging reference value CRV2. Preferably, even in the riding converging state, the electronic controller 72 does not obtain the converging reference value CRV during at least one of the first period from when the human-powered vehicle 10 starts to travel, the second period from when the transmission device 42 performs shifting, and the third period immediately before the transmission device 42 performs shifting. The electronic controller 72 can be configured to determine that the human-powered vehicle 10 is not in the riding converging state during at least one of the first period from when the human-powered vehicle 10 starts to travel, the second period from when the transmission device 42 performs shifting, and the third period immediately before the transmission device 42 performs shifting.

Figure 3:
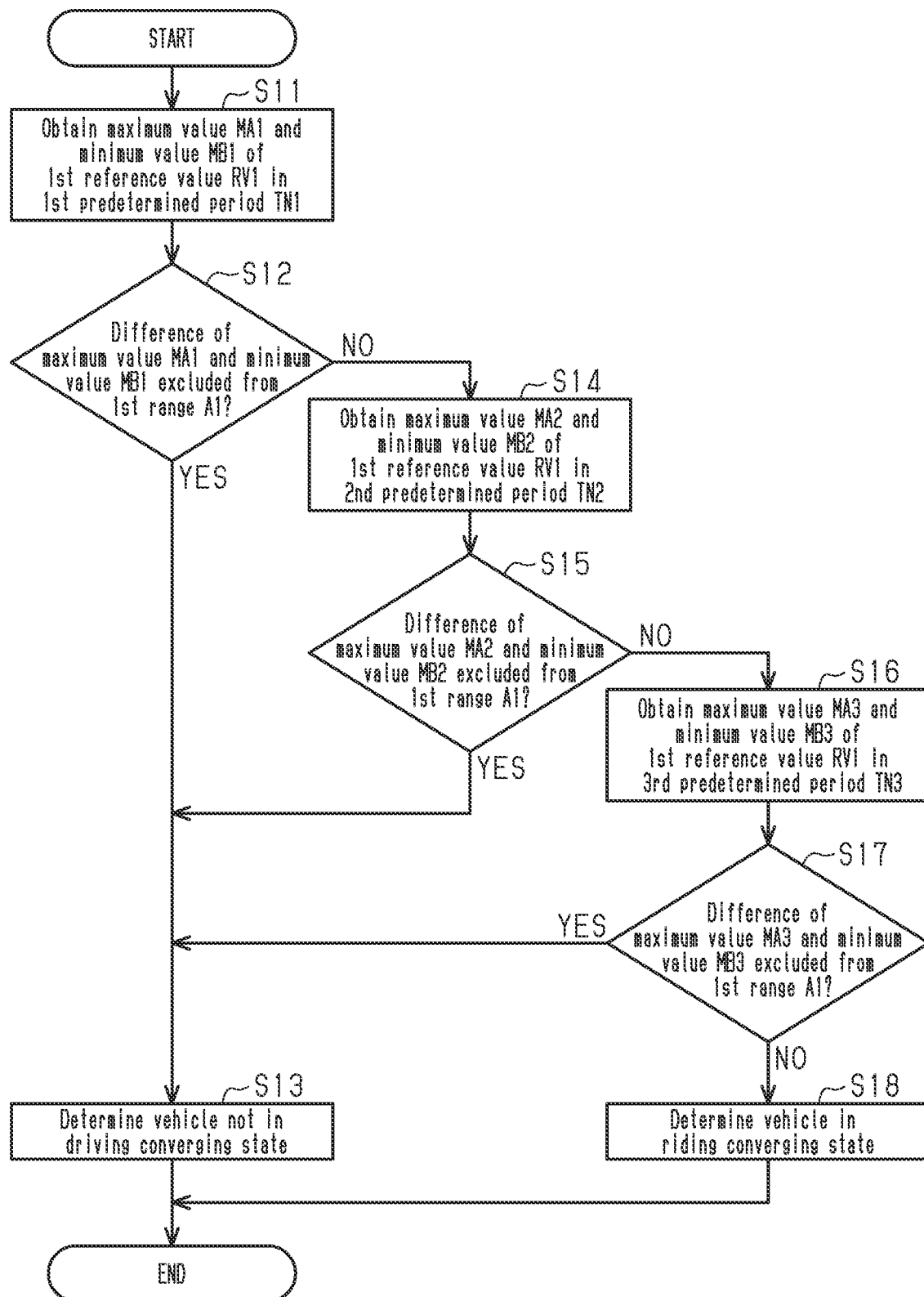
FIG. 3 is a flowchart showing an example of a riding converging state determination process executed by the electronic controller shown in FIG. 2.

The electronic controller 72 can define the riding converging state using a process other than those shown in FIGS. 3 and 4. The electronic controller 72 can perform various calculation using a moving average or variance of the reference value RV. The electronic controller 72 can calculate the converging reference value CRV in accordance with a moving average or variance of the reference value RV. For example, in a case where the moving average of the reference value RV is included in a predetermined value average range, the electronic controller 72 determines that the reference value RV is in the riding converging state and uses the moving average of the most recent reference value RV as the converging reference value CRV. For example, in a case where variance of the reference value RV is included in a predetermined range, the electronic controller 72 determines that the reference value RV is in the riding converging state and uses the most recent reference value RV or an average of detected values of recent reference values RV as the converging reference value CRV.

Preferably, the electronic controller 72 is configured to control the component 50 of the human-powered vehicle in accordance with a control state including a first mode and a second mode that differs from the first mode.

In a case where the component 50 includes the motor 52, for example, the first mode and the second mode differ from each other in at least one of the assist level of the motor 52, the maximum value of the output of the motor 52, the output of the motor 52, and the response speed of the output of the motor 52 with respect to the human driving force input to the human-powered vehicle 10.

The electronic controller 72 is configured to control the motor 52, for example, so that the assist level of the motor 52 equals a predetermined assist level. The assist level includes a ratio of an assist force generated by the motor 52 to a human driving force or a ratio of the assist force generated by the motor 52 to a rotational speed of the crank axle 26. The ratio of the assist force generated by the motor 52 to the human driving force can be also referred to as the assist ratio. The assist ratio can be a torque ratio of the assist torque to the human torque of the human-powered vehicle 10 or a ratio of the assist power of the motor 52 to the human power.

The electronic controller 72 is configured to control the motor 52 so that the assist force is less than or equal to the maximum value. In a case where the output of the motor 52 is input to the first rotary body 34 and the assist force is expressed as torque, the electronic controller 72 is configured to control the motor 52 so that the assist torque is less than or equal to the maximum value. Preferably, the maximum value is included in a range of 20 Nm or greater and 200 Nm or less. The maximum value is specified, for example, by the output characteristics of the motor 52. In a case where the output of the motor 52 is input to the first rotary body 34 and the assist force is expressed as power, the electronic controller 72 is configured to control the motor 52 so that the assist power is less than or equal to the maximum value.

Preferably, the response speed of the motor 52 includes at least one of a first response speed in a case where the human driving force or the rotational speed of the crank axle 26 is increased and a second response speed in a case where the human driving force or the rotational speed of the crank axle 26 is decreased. The response speed of the motor 52 is expressed as a changing amount of the output of the motor 52 per unit time relative to a changing amount of a control parameter of the motor 52 per unit time.

The electronic controller 72 changes the first response speed using, for example, a first filter. The first filter includes, for example, a low-pass filter having a first time constant. The electronic controller 72 changes the first time constant of the first filter to change the first response speed. The electronic controller 72 can change a gain for calculating the output of the motor 52 from the human driving force to change the first response speed. The first filter is, for example, implemented by executing predetermined software with a processor.

The electronic controller 72 changes the second response speed using, for example, a second filter. The second filter includes, for example, a low-pass filter having a second time constant. The electronic controller 72 changes the second time constant of the second filter to change the second response speed. The electronic controller 72 can change a gain for calculating the output of the motor 52 from the human driving force to change the second response speed. The second filter is, for example, implemented by executing predetermined software with a processor.

The electronic controller 72 can be configured to switch the first mode and the second mode in accordance with at least one of model of the human-powered vehicle 10 and size of the wheel 12 of the human-powered vehicle 10. For example, the storage 74 stores information used in the first mode and information used in the second mode. Preferably, the electronic controller 72 is configured to switch the first mode and the second mode in correspondence with an input signal from an external device or an operation performed on a mode switch operation portion provided on the human-powered vehicle 10. The first mode and the second mode can be configured to be changed by a rider. One of the first mode and the second mode can be selected at the time of shipment. In this case, the component 50 includes, for example, at least one of the motor 52, the transmission device 42, a brake device, an adjustable seatpost, a suspension device, and a cycle computer.

In a case where the component 50 includes the transmission device 42, the first mode and the second mode can be modes provided in the second control state. In this case, the shifting condition is set for each of the first mode and the second mode. For example, the shifting condition for the first mode differs from the shifting condition for the second mode. In this case, the first mode and the second mode are associated with, for example, the environment of the road on which the human-powered vehicle 10 is traveling. The environment of the road is, for example, a mountain trail, a town street, and a racing course.

Figure 5:
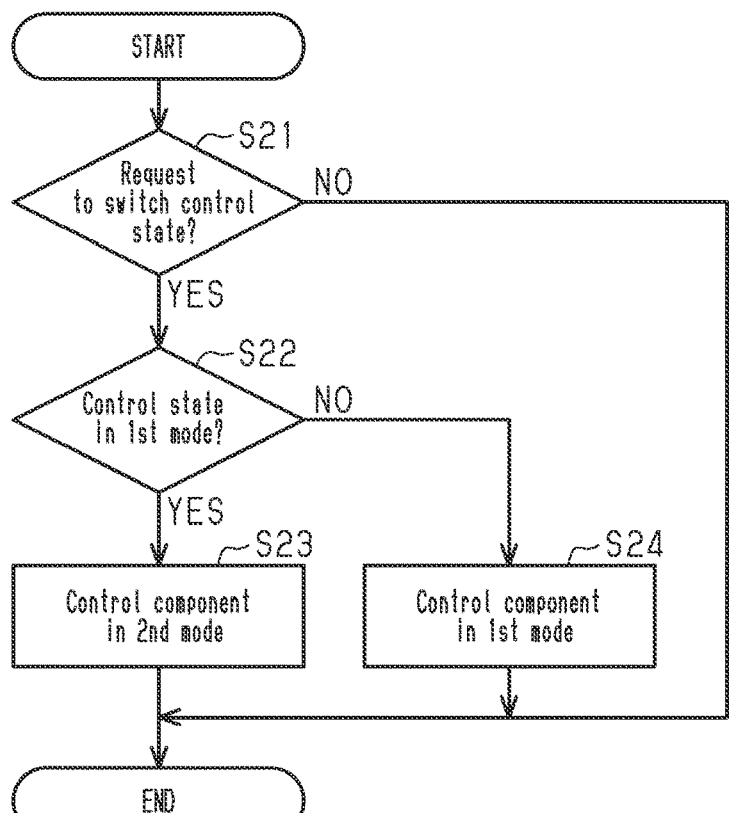
FIG. 5 is a flowchart showing an example of component control executed by the electronic controller shown in FIG. 2.

An example of control of the component 50 executed by the human-powered vehicle control device 70 shown in FIG. 2 will now be described with reference to FIG. 5. In a case where electric power is supplied to the electronic controller 72, the electronic controller 72 starts the process and proceeds to step S21 of the flowchart shown in FIG. 5. In a case where the flowchart shown in FIG. 5 ends, the electronic controller 72 repeats the process from step S21 after a predetermined interval until the supply of electric power is stopped.

In step S21, the electronic controller 72 determines whether there is a request for switching the control state. For example, in a case where the rider of the human-powered vehicle 10 operates a control state switching operation portion that switches the control state, the electronic controller 72 determines that there is a request for switching the control state. In a case where there is no request for switching the control state, the electronic controller 72 ends the process. In a case where there is a request for switching the control state, the electronic controller 72 proceeds to step S22.

In step S22, the electronic controller 72 determines whether the control state is the first mode. In a case where the control state is the first mode, the electronic controller 72 proceeds to step S23. In step S23, the electronic controller 72 switches the control state to the second mode and controls the component 50 in the second mode and then ends the process.

In step S22, in a case where the control state is not the first mode, the electronic controller 72 proceeds to step S24. In step S24, the electronic controller 72 switches the control state to the first mode and controls the component 50 in the first mode and then ends the process.

The electronic controller 72 changes the shifting condition in accordance with a converging reference value CRV for a case where the control state is the second control state. Preferably, the electronic controller 72 changes the shifting condition in accordance with at least one of the first converging reference value CRV1 for a case where the control state is the second control state and the second converging reference value CRV2 for a case where the control state is the second control state.

In the present embodiment, the electronic controller 72 is configured to actuate the transmission device 42 to change the transmission ratio in accordance with a shifting condition that includes a first shifting condition and a second shifting condition. In a case where the control state is the first mode, the electronic controller 72 is configured to actuate the transmission device 42 to change the transmission ratio in accordance with the first shifting condition. In a case where the control state is the second mode, the electronic controller 72 is configured to actuate the transmission device 42 to change the transmission ratio in accordance with the second shifting condition.

The electronic controller 72 changes the first shifting condition in accordance with a converging reference value CRVA, which is a reference value RV related to the traveling state of the human-powered vehicle 10 for a case where the control state is the first mode and the human-powered vehicle 10 is in the riding converging state. The electronic controller 72 changes the second shifting condition in accordance with a converging reference value CRVB, which is the reference value RV for a case where the control state is the second mode and the human-powered vehicle 10 is in the riding converging state. The converging reference value CRVA is a reference value RV for a case where the control state is the first mode and the human-powered vehicle 10 is in the riding converging state. The converging reference value CRVB is a reference value RV for a case where the control state is the second mode and the human-powered vehicle 10 is in the riding converging state. The converging reference value CRVA can differ from or equal the converging reference value CRVB. Preferably, the converging reference value CRVA and the converging reference value CRVB are the first converging reference value CRV1.

Figure 6:
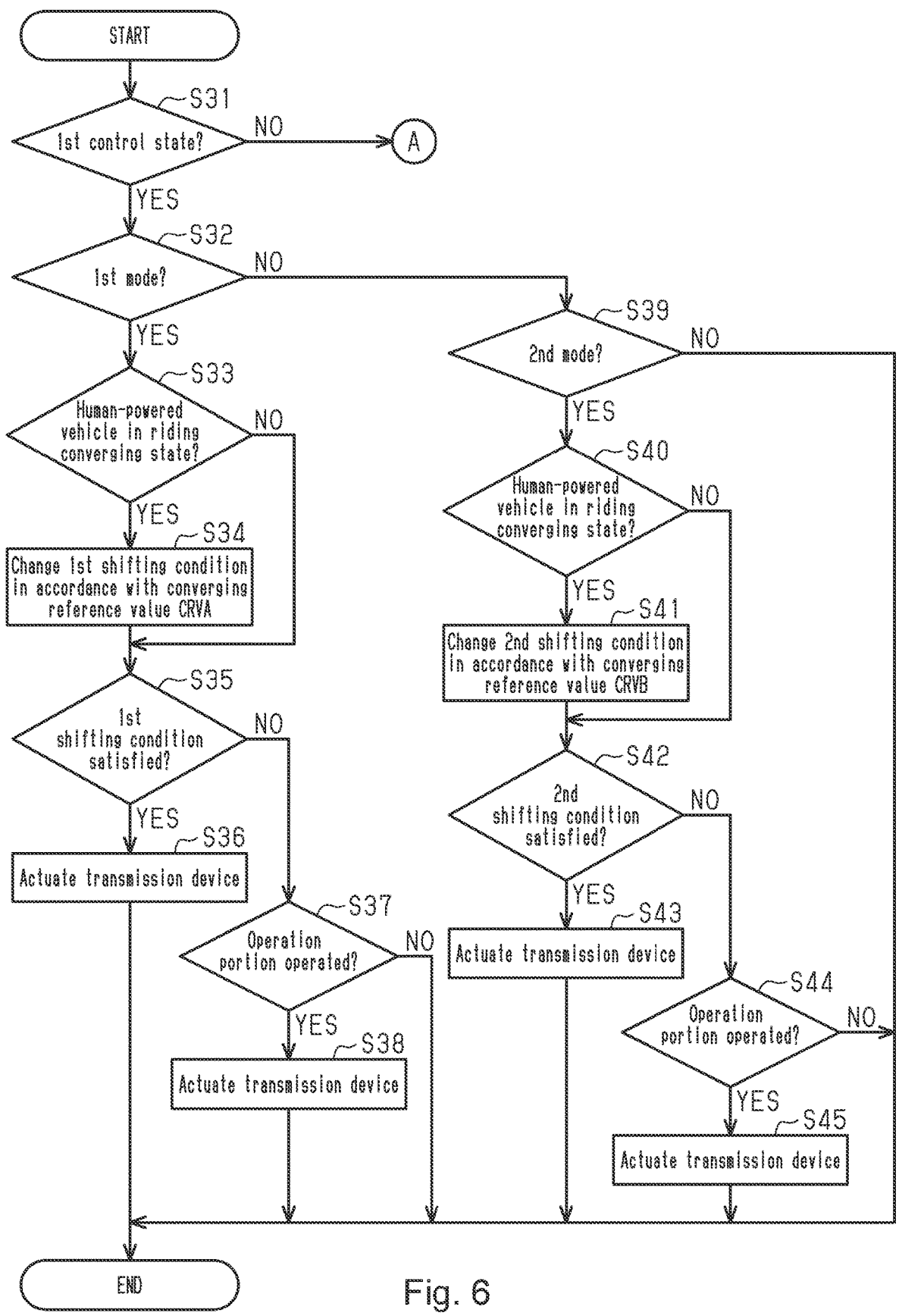
FIG. 6 is a flowchart showing an example of control executed by the electronic controller shown in FIG. 2.

An example of control executed by the electronic controller 72 shown in FIG. 2 will now be described with reference to FIGS. 6 and 7. In a case where electric power is supplied to the electronic controller 72, the electronic controller 72 starts the process and proceeds to step S31 of the flowchart shown in FIG. 6. Upon completion of the flowcharts shown in FIGS. 6 and 7, the electronic controller 72 repeats the process from step S31 in predetermined cycles until the supply of electric power is stopped.

In step S31, the electronic controller 72 determines whether the control state is the first control state. In step S31, in a case where the control state is the first control state, the electronic controller 72 proceeds to step S32. In step S32, the electronic controller 72 determines whether the control state is the first mode. In step S32, in a case where the control state is the first mode, the electronic controller 72 proceeds to step S33.

In step S33, the electronic controller 72 determines whether the human-powered vehicle 10 is in the riding converging state. In step S33, the electronic controller 72 determines the riding converging state through the processes shown in FIGS. 3 and 4. In a case where the human-powered vehicle 10 is not in the riding converging state, the electronic controller 72 proceeds to step S35. In step S33, in a case where the human-powered vehicle 10 is in the riding converging state, the electronic controller 72 proceeds to step S34.

In step S34, the electronic controller 72 changes the first shifting condition in accordance with the converging reference value CRVA and then proceeds to step S35. In step S35, the electronic controller 72 determines whether the first shifting condition is satisfied. In a case where the first shifting condition is not satisfied, the electronic controller 72 proceeds to step S37. In a case where the first shifting condition is satisfied, the electronic controller 72 proceeds to step S36. In step S36, the electronic controller 72 actuates the transmission device 42 to change the transmission ratio and then ends the process.

In step S37, the electronic controller 72 determines whether the operation portion 60 is operated. In step S37, in a case where the operation portion 60 is not operated, the electronic controller 72 ends the process.

In step S37, in a case where the operation portion 60 is operated, the electronic controller 72 proceeds to step S38. In step S38, the electronic controller 72 actuates the transmission device 42 to change the transmission ratio and then ends the process.

In step S32, in a case where the control state is not the first mode, the electronic controller 72 proceeds to step S39. In step S39, the electronic controller 72 determines whether the control state is the second mode. In step S39, in a case where the control state is the second mode, the electronic controller 72 proceeds to step S40.

In step S40, the electronic controller 72 determines whether the human-powered vehicle 10 is in the riding converging state. In step S40, the electronic controller 72 determines the riding converging state through the processes shown in FIGS. 3 and 4. In a case where the human-powered vehicle 10 is not in the riding converging state, the electronic controller 72 proceeds to step S42. In a case where the human-powered vehicle 10 is in the riding converging state, the electronic controller 72 proceeds to step S41.

In step S41, the electronic controller 72 changes the second shifting condition in accordance with the converging reference value CRVB and then proceeds to step S42. In step S42, the electronic controller 72 determines whether the second shifting condition is satisfied. In a case where the second shifting condition is not satisfied, the electronic controller 72 proceeds to step S44. In a case where the second shifting condition is satisfied, the electronic controller 72 proceeds to step S43. In step S43, the electronic controller 72 actuates the transmission device 42 to change the transmission ratio and then ends the process.

In step S44, the electronic controller 72 determines whether the operation portion 60 is operated. In step S44, in a case where the operation portion 60 is not operated, the electronic controller 72 ends the process.

In step S44, in a case where the operation portion 60 is operated, the electronic controller 72 proceeds to step S45. In step S45, the electronic controller 72 actuates the transmission device 42 to change the transmission ratio and then ends the process.

In step S39, in a case where the control state is not the second mode, the electronic controller 72 ends the process. For example, the control state can include a mode differing from the first mode and the second mode. In a case where the control state includes a mode differing from the first mode and the second mode and a negative determination is made in step S39, the electronic controller 72 can determine whether the control state is the mode differing from the first mode and the second mode. In a case where it is determined that the control state is the mode differing from the first mode and the second mode, the electronic controller 72 can execute the same steps as steps S33 to S38 or steps S40 to S45. In a case where the control state includes only the first mode and the second mode, step S39 can be omitted. In this case, in a case where it is determined in step S32 that the control state is not the first mode, the electronic controller 72 can proceed to step S40.

Figure 7:
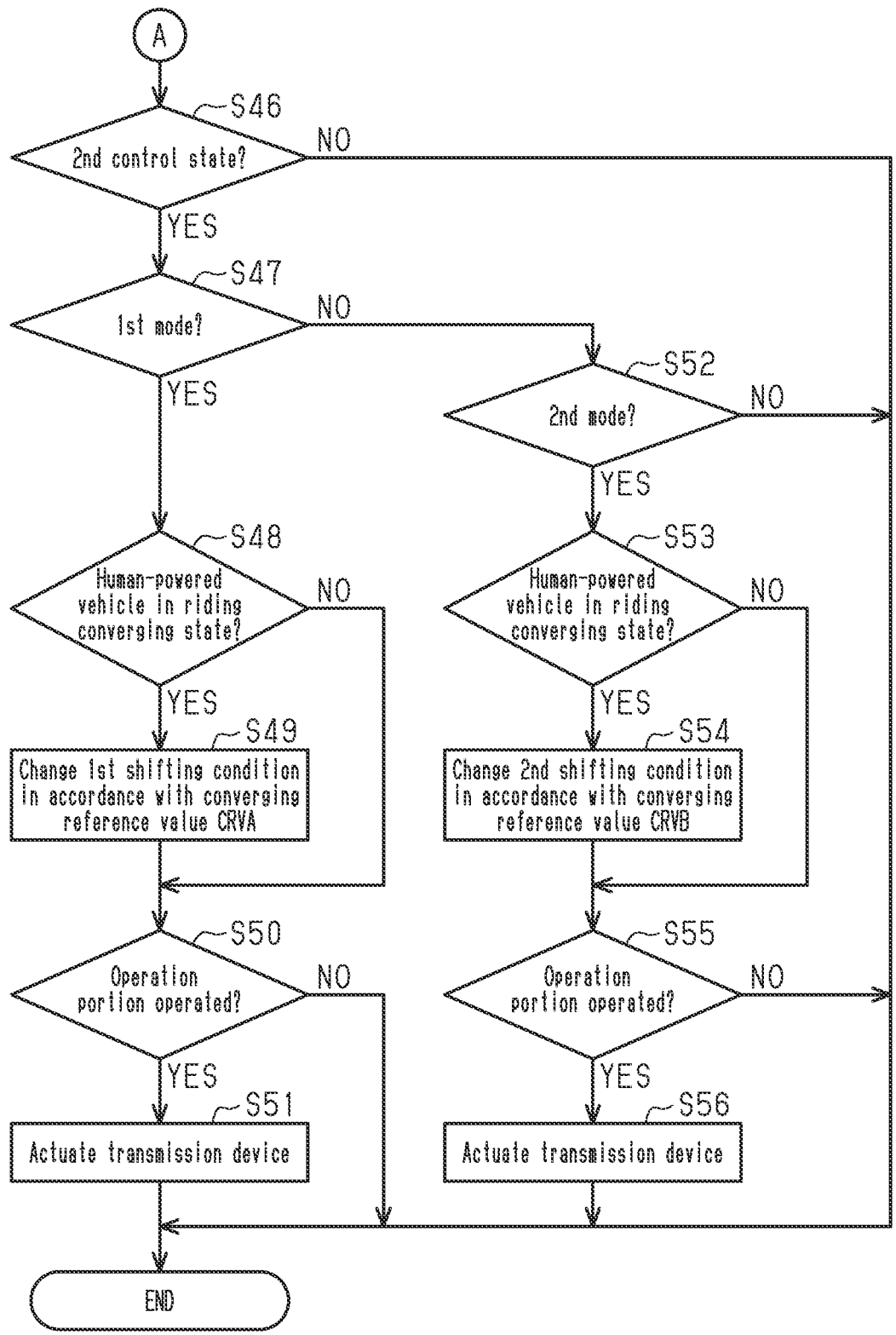
FIG. 7 is a flowchart showing an example of control executed by the electronic controller shown in FIG. 2.

In step S31, in a case where the control state is not the first control state, the electronic controller 72 proceeds to step S46 shown in FIG. 7. In step S46, the electronic controller 72 determines whether the control state is the second control state.

In step S46, in a case where the control state is the second control state, the electronic controller 72 proceeds to step S47. In step S47, the electronic controller 72 determines whether the control state is the first mode. In step S47, in a case where the control state is the first mode, the electronic controller 72 proceeds to step S48.

In step S48, the electronic controller 72 determines whether the human-powered vehicle 10 is in the riding converging state. In step S48, the electronic controller 72 determines the riding converging state through the processes shown in FIGS. 3 and 4. In step S48, in a case where the human-powered vehicle 10 is not in the riding converging state, the electronic controller 72 proceeds to step S50. In step S48, in a case where the human-powered vehicle 10 is in the riding converging state, the electronic controller 72 proceeds to step S49.

In step S49, the electronic controller 72 changes the first shifting condition in accordance with the converging reference value CRVA and then proceeds to step S50. In step S50, the electronic controller 72 determines whether the operation portion 60 is operated. In step S50, in a case where the operation portion 60 is not operated, the electronic controller 72 ends the process.

In step S50, in a case where the operation portion 60 is operated, the electronic controller 72 proceeds to step S51. In step S51, the electronic controller 72 actuates the transmission device 42 to change the transmission ratio and then ends the process.

In step S47, in a case where the control state is not the first mode, the electronic controller 72 proceeds to step S52. In step S52, the electronic controller 72 determines whether the control state is the second mode. In step S52, in a case where the control state is the second mode, the electronic controller 72 proceeds to step S53.

In step S53, the electronic controller 72 determines whether the human-powered vehicle 10 is in the riding converging state. In step S53, the electronic controller 72 determines the riding converging state through the processes shown in FIGS. 3 and 4. In step S53, in a case where the human-powered vehicle 10 is not in the riding converging state, the electronic controller 72 proceeds to step S55. In a case where the human-powered vehicle 10 is in the riding converging state, the electronic controller 72 proceeds to step S54.

In step S54, the electronic controller 72 changes the second shifting condition in accordance with the converging reference value CRVB and then proceeds to step S55. In step S55, the electronic controller 72 determines whether the operation portion 60 is operated. In step S55, in a case where the operation portion 60 is not operated, the electronic controller 72 ends the process.

In step S55, in a case where the operation portion 60 is operated, the electronic controller 72 proceeds to step S56. In step S56, the electronic controller 72 actuates the transmission device 42 to change the transmission ratio and then ends the process.

In step S52, in a case where the control state is not the second mode, the electronic controller 72 ends the process. In a case where the control state includes a mode differing from the first mode and the second mode and a negative determination is made in step S52, the electronic controller 72 can determine whether the control state is the mode differing from the first mode and the second mode. In a case where the control state is the mode differing from the first mode and the second mode, the electronic controller 72 can execute the same steps as steps S48 to S51 or steps S53 to S56. In a case where the control state includes only the first mode and the second mode, step S52 can be omitted. In this case, in a case where it is determined in step S47 that the control state is not the first mode, the electronic controller 72 can proceed to step S53.

In step S46, in a case where the control state is not the second control state, the electronic controller 72 ends the process. The control state can include a control state that differs from the first control state and the second control state. In a case where the control state includes a control state that differs from the first control state and the second control state and a negative determination is made in step S46, the electronic controller 72 can determine whether the control state is the control state differing from the first control state and the second control state. In a case where the control state is the control state differing from the first control state and the second control state, the electronic controller 72 can execute the same steps as steps S32 to S45 or steps S47 to S56. In a case where the control state includes only the first control state and the second control state, step S46 can be omitted. In this case, in a case where it is determined in step S31 that the control state is not the first control state, the electronic controller 72 can proceed to step S47.

The electronic controller 72 changes a predetermined range in accordance with the converging reference value CRV to change the shifting condition. Preferably, the electronic controller 72 changes the predetermined range in accordance with the first converging reference value CRV1 to change the shifting condition. Preferably, the electronic controller 72 changes at least one of the upper limit value and the lower limit value of the predetermined range to change the predetermined range. Preferably, the electronic controller 72 changes both the upper limit value and the lower limit value of the predetermined range to change the predetermined range. Preferably, the electronic controller 72 changes the upper limit value and the lower limit value of the predetermined range without changing the size of the predetermined range.

The electronic controller 72 changes a specifying value, which specifies the predetermined range, by a predetermined changing value in accordance with a difference D of the converging reference value CRV and a first predetermined value that is included in the predetermined range. Preferably, the electronic controller 72 changes the specifying value, which specifies the predetermined range, by the predetermined changing value in accordance with a difference D of the first converging reference value CRV1 and the first predetermined value included in the predetermined range. The specifying value includes at least one of the upper limit value and the lower limit value of the predetermined range. Preferably, the specifying value includes both the upper limit value and the lower limit value of the predetermined range. The electronic controller 72 changes both the upper limit value and the lower limit value of the predetermined range by the predetermined changing value to change the predetermined range. The first predetermined value is, for example, the median of the predetermined range.

Preferably, the electronic controller 72 changes the predetermined range so that the median of the predetermined range approaches the converging reference value CRV. For example, in a case where the converging reference value CRV is greater than the median of the predetermined range, the electronic controller 72 increases the specifying value by the predetermined changing value. For example, in a case where the converging reference value CRV is less than the median of the predetermined range, the electronic controller 72 decreases the specifying value by the predetermined changing value.

In a case where the absolute value of the difference D is greater than or equal to a first difference D1, the electronic controller 72 changes the specifying value in increments of a first changing value. For example, in a case where the absolute value of the difference D is greater than or equal to the first difference D1, the electronic controller 72 changes the specifying value in increments of the first changing value until the specifying value equals the predetermined changing value. The first changing value can be set in any manner. For example, in a case where the predetermined range corresponds to cadence, the first changing value is a numeral value that is greater than or equal to 1 rpm.

In a case where the absolute value of the difference D is greater than or equal to a second difference D2, which is greater than the first difference D1, the electronic controller 72 changes the specifying value in increments of a second changing value that is greater than the first changing value. For example, in a case where the absolute value of the difference D is greater than or equal to the second difference D2, which is greater than the first difference D1, the electronic controller 72 changes the specifying value in increments of the second changing value, which is greater than the first changing value, until the specifying value equals the predetermined changing value. The second changing value can be set in any manner. For example, in a case where the predetermined range corresponds to cadence, the second changing value is a numeral value that is greater than or equal to 2 rpm.

The electronic controller 72 does not change the shifting condition in a case where the absolute value of the difference D is included in a third difference D3, which is less than the first difference D1. The predetermined changing value can include a changing value that differs from the first changing value and the second changing value. Preferably, the first difference D1 and the third difference D3 are integers. The first difference D1 and the third difference D3 can be the same numeral value.

Preferably, the electronic controller 72 changes the predetermined changing value in accordance with the second converging reference value CRV2. The electronic controller 72 changes at least one of the first difference D1, the second difference D2, and the third difference D3 in accordance with the second converging reference value CRV2. The electronic controller 72 does not change the predetermined changing value in accordance with the second converging reference value CRV2 in a case where the second converging reference value CRV2 is included in a first range B1. Preferably, the first range B1 is greater than or equal to 15

Nm and less than or equal to 40 Nm. The first range B1 is set to be, for example, a range that allows for determination whether the load on the rider is appropriate.

In a case where the converging reference value CRV includes the converging reference value CRVA for the first mode and the converging reference value CRVB for the second mode, in the first mode, the electronic controller 72 changes the predetermined range of the first shifting condition in accordance with the converging reference value CRVA for the first mode and changes the predetermined range of the second shifting condition in accordance with the converging reference value CRVB for the second mode.

Figure 8:
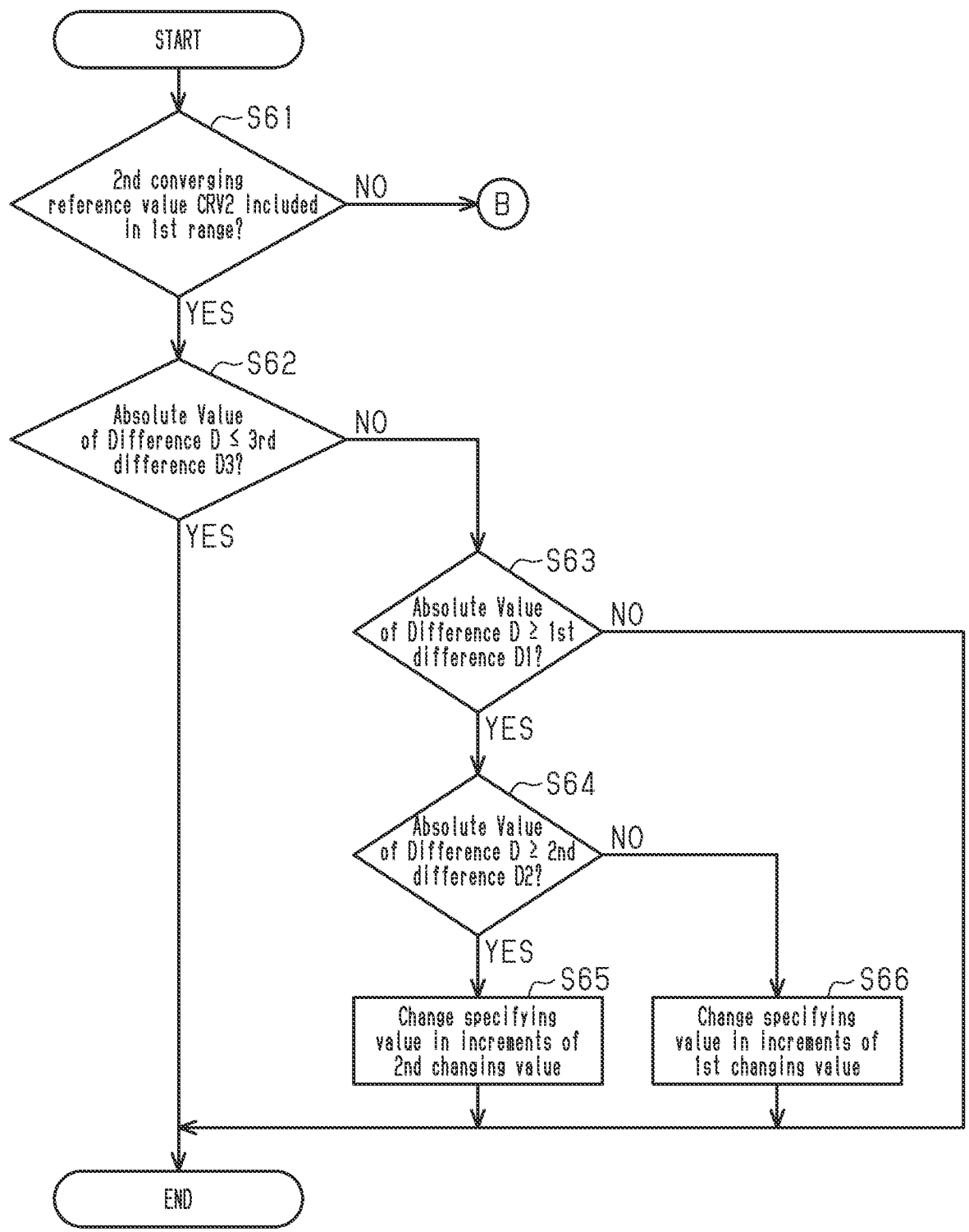
FIG. 8 is a flowchart showing an example of a shifting condition changing process executed by the electronic controller shown in FIG. 2.

An example of a process for changing the shifting condition executed by the electronic controller 72 shown in FIG. 2 will now be described with reference to FIGS. 8 and 9. In a case where the electronic controller 72 is supplied with electric power, the electronic controller 72 starts the process and proceeds to step S61 of the flowchart shown in FIG. 8. Upon completion of the flowcharts shown in FIGS. 8 and 9, the electronic controller 72 repeats the process from step S61 in predetermined cycles until the supply of electric power is stopped.

In step S61, the electronic controller 72 determines whether the second converging reference value CRV2 is included in the first range B1. In a case where the second converging reference value CRV2 is included in the first range B1, the electronic controller 72 proceeds to step S62.

In step S62, the electronic controller 72 determines whether the absolute value of the difference D is included in the third difference D3. In step S62, in a case where the absolute value of the difference D is included in the third difference D3, the electronic controller 72 ends the process. In step S62, in a case where the absolute value of the difference D is greater than the third difference D3, the electronic controller 72 proceeds to step S63.

In step S63, the electronic controller 72 determines whether the absolute value of the difference D is greater than or equal to the first difference D1. In step S63, in a case where the absolute value of the difference D is less than the first difference D1, the electronic controller 72 ends the process.

In step S63, in a case where the absolute value of the difference D is greater than or equal to the first difference D1, the electronic controller 72 proceeds to step S64. In step S64, the electronic controller 72 determines whether the absolute value of the difference D is greater than or equal to the second difference D2.

In step S64, in a case where the absolute value of the difference D is greater than or equal to the second difference D2, the electronic controller 72 proceeds to step S65. In step S65, the electronic controller 72 changes the specifying value in increments of the second changing value and then ends the process.

In step S64, in a case where the absolute value of the difference D is less than the second difference D2, the electronic controller 72 proceeds to step S66. In step S66, the electronic controller 72 changes the specifying value in increments of the first changing value and then ends the process.

Figure 9:
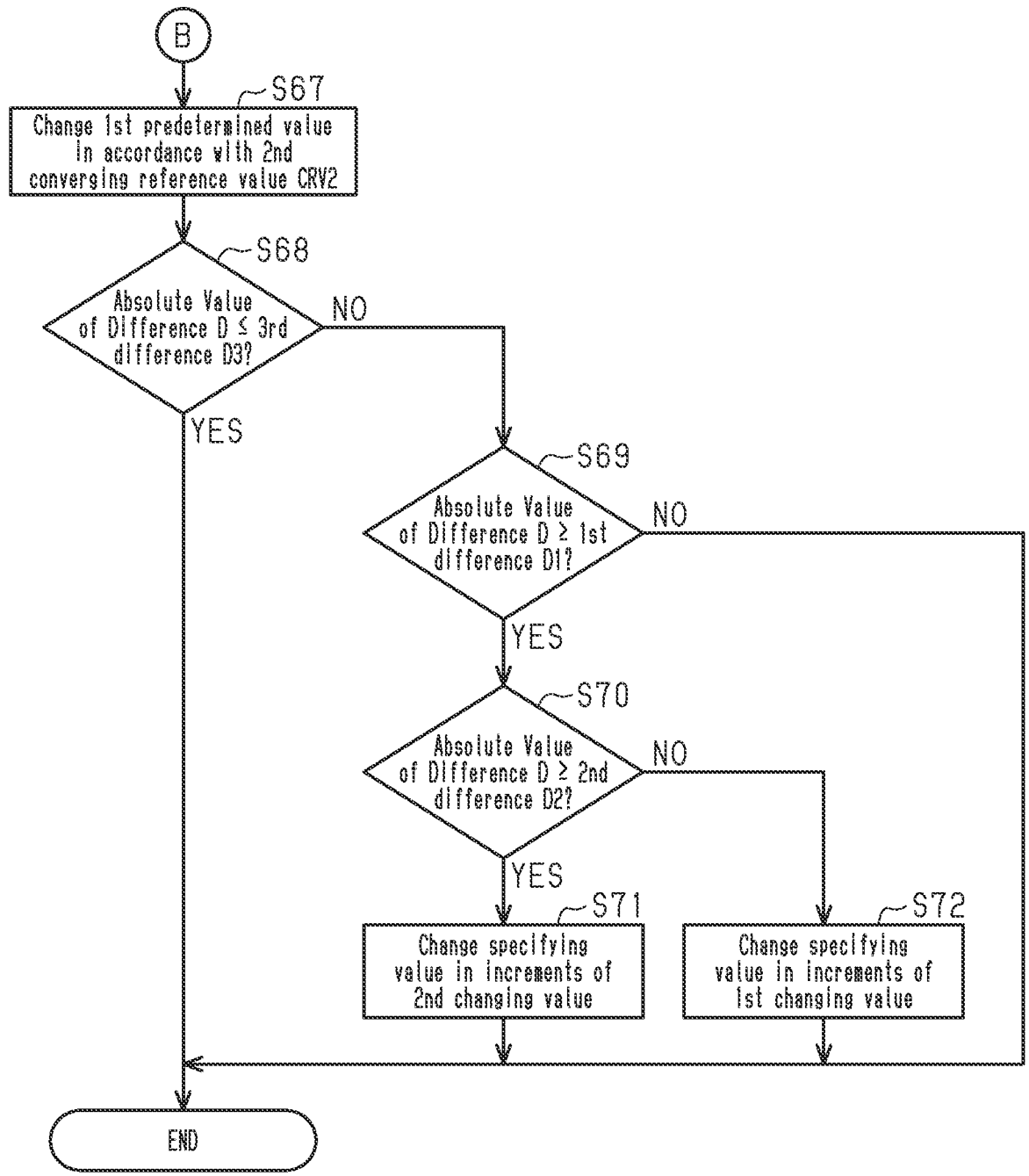
FIG. 9 is a flowchart showing an example of a shifting condition changing process executed by the electronic controller shown in FIG. 2.

In step S61, in a case where the second converging reference value CRV2 is excluded from the first range B1, the electronic controller 72 proceeds to step S67 shown in FIG. 9. In step S67, the electronic controller 72 changes the first predetermined value in accordance with the second converging reference value CRV2 and then proceeds to step S68. The electronic controller 72 changes the first predetermined value, for example, by a second predetermined value.

In step S67, in a case where the electronic controller 72 changes the first predetermined value, the electronic controller 72 does not change the predetermined range. In step S68, the electronic controller 72 can change the first difference D1, the second difference D2, and the third difference D3 in accordance with the second converging reference value CRV2 without changing the second predetermined value.

In step S68, the electronic controller 72 determines whether the absolute value of the difference D is included in the third difference D3. In step S68, in a case where the absolute value of the difference D is included in the third difference D3, the electronic controller 72 ends the process. In step S68, in a case where the absolute value of the difference D is greater than the third difference D3, the electronic controller 72 proceeds to step S69.

In step S69, the electronic controller 72 determines whether the absolute value of the difference D is greater than or equal to the first difference D1. In step S69, in a case where the absolute value of the difference D is less than the first difference D1, the electronic controller 72 ends the process.

In step S69, in a case where the absolute value of the difference D is greater than or equal to the first difference D1, the electronic controller 72 proceeds to step S70. In step S70, the electronic controller 72 determines whether the absolute value of the difference D is greater than or equal to the second difference D2.

In step S70, in a case where the absolute value of the difference D is greater than or equal to the second difference D2, the electronic controller 72 proceeds to step S71. In step S71, the electronic controller 72 changes the specifying value in increments of the second changing value and then ends the process. The second changing value can be set in any manner.

In step S70, in a case where the absolute value of the difference D is less than the second difference D2, the electronic controller 72 proceeds to step S72. In step S72, the electronic controller 72 changes the specifying value in increments of the first changing value and then ends the process.

Second Embodiment

Figure 10:
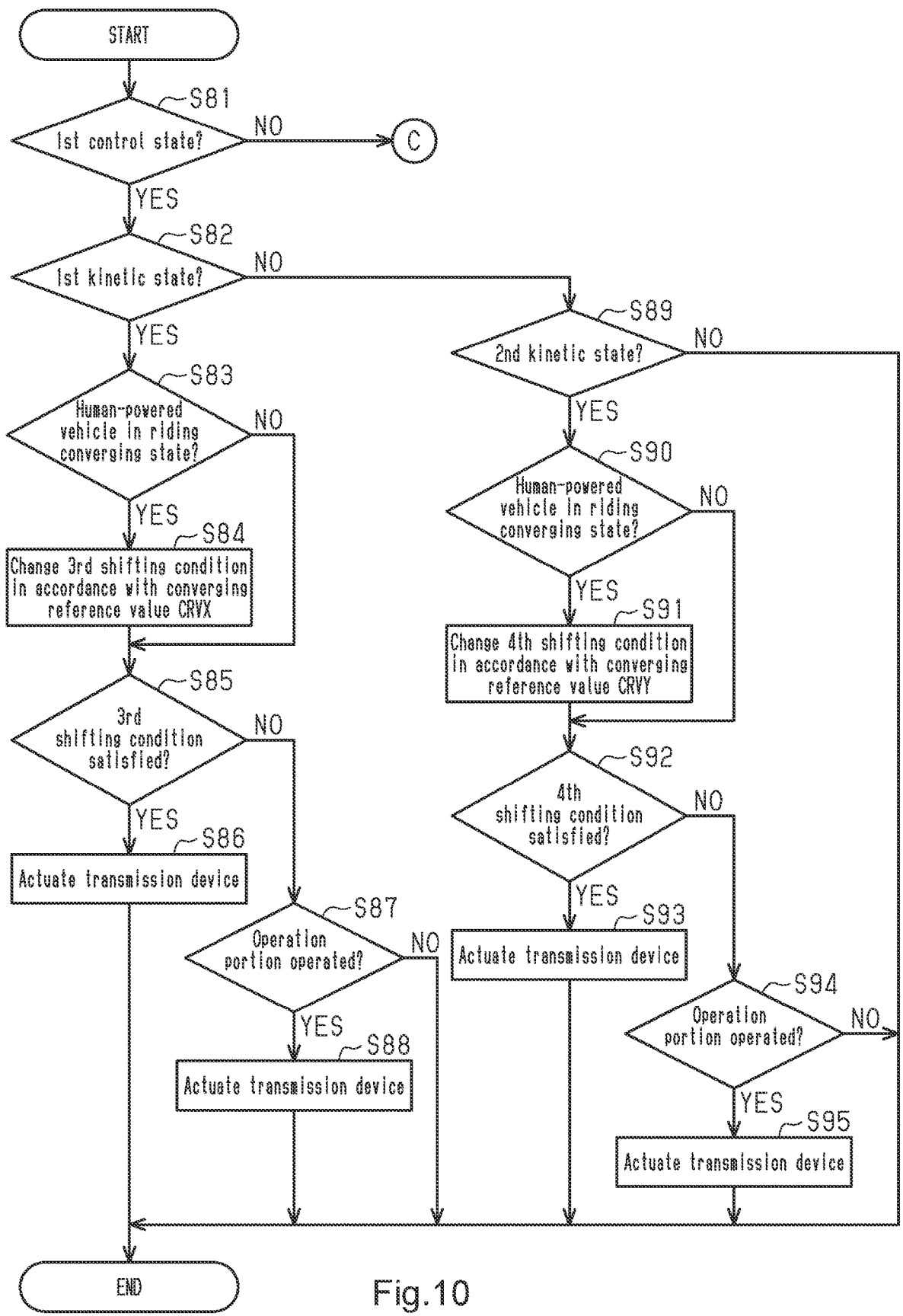
FIG. 10 is a flowchart showing an example of control executed by an electronic controller in accordance with a second embodiment.

A second embodiment of a human-powered vehicle control device 70 will now be described with reference to FIGS. 10 and 11. The human-powered vehicle control device 70 of the second embodiment and the human-powered vehicle control device 70 of the first embodiment have common configurations. Same reference characters are given to those configurations that are common to the first embodiment. Such configurations will not be described in detail.

The shifting condition is set for each kinetic state of the human-powered vehicle 10. The electronic controller 72 is configured to actuate the transmission device 42 to change the transmission ratio in accordance with a shifting condition that includes a third shifting condition and a fourth shifting condition.

The electronic controller 72 is configured to actuate the transmission device 42 to change the transmission ratio in accordance with the third shifting condition in a case where the kinetic state of the human-powered vehicle 10 is a first kinetic state. The electronic controller 72 is configured to actuate the transmission device 42 to change the transmission ratio in accordance with the fourth shifting condition in a case where the kinetic state of the human-powered vehicle 10 is a second kinetic state that differs from the first kinetic state.

The electronic controller 72 changes the third shifting condition in accordance with a converging reference value CRVX, which is a reference value RV related to the traveling state of the human-powered vehicle 10 for a case where the kinetic state of the human-powered vehicle 10 is the first kinetic state and the human-powered vehicle 10 is in the riding converging state. The electronic controller 72 changes the fourth shifting condition in accordance with a converging reference value CRVY, which is the reference value RV for a case where the kinetic state of the human-powered vehicle 10 is the second kinetic state and the human-powered vehicle 10 is in the riding converging state.

The kinetic state includes, for example, a human driving force input to the human-powered vehicle 10. In a case the kinetic state includes a human driving force input to the human-powered vehicle 10, the human-powered vehicle 10 includes the human driving force detector 58. In a case where the kinetic state includes a parameter related to a tilt of the human-powered vehicle 10 and the parameter related to the tilt includes an acceleration of the human-powered vehicle 10, the human-powered vehicle 10 further includes at least one of a vehicle speed detector and an acceleration detector. In a case where the human-powered vehicle 10 includes a vehicle speed detector, the acceleration is calculated from the vehicle speed detected by the vehicle speed detector.

The kinetic state includes, for example, tilt of the human-powered vehicle 10. The electronic controller 72 changes the shifting condition in accordance with a parameter related to the tilt of the human-powered vehicle 10. The parameter includes at least one of an acceleration of the human-powered vehicle 10, a pitch angle of the human-powered vehicle 10, a roll angle of the human-powered vehicle 10, and a yaw angle of the human-powered vehicle 10.

In a case where the kinetic state includes a parameter related to a tilt of the human-powered vehicle 10 and the parameter related to the tilt includes at least one of a pitch angle of the human-powered vehicle 10, a roll angle of the human-powered vehicle 10, and a yaw angle of the human-powered vehicle 10, the human-powered vehicle 10 further includes a tilt angle detector. The tilt angle detector is configured to detect at least one of a pitch angle of the human-powered vehicle 10, a roll angle of the human-powered vehicle 10, and a yaw angle of the human-powered vehicle 10 as an inclination angle with respect to a traveling direction of the vehicle body 14 of the human-powered vehicle 10.

A case where the kinetic state is the first kinetic state corresponds to, for example, a case where a parameter related to the kinetic state is included in a first predetermined range. A case where the kinetic state is the second kinetic state corresponds to, for example, a case where a parameter related to the kinetic state is included in a second predetermined range that differs from the first predetermined range.

The converging reference value CRVX is a reference value RV for a case where the kinetic state is the first kinetic state and the human-powered vehicle 10 is in the riding converging state. The converging reference value CRVY is a reference value RV for a case where the kinetic state is the second kinetic state and the human-powered vehicle 10 is in the riding converging state. The converging reference value CRVX can differ from or equal the converging reference value CRVY. Preferably, the converging reference value CRVX and the converging reference value CRVY are the first converging reference value CRV1.

In a case where the converging reference value CRV includes the converging reference value CRVX for the first kinetic state and the converging reference value CRVY for the second kinetic state, in the first kinetic state, the electronic controller 72 changes the predetermined range of the third shifting condition in accordance with the converging reference value CRVX for the first kinetic state and changes the predetermined range of the fourth shifting condition in accordance with the converging reference value CRVY for the second kinetic state.

An example of control executed by the electronic controller 72 shown in FIG. 2 will now be described with reference to FIGS. 10 and 11. In a case where the electronic controller 72 is supplied with electric power, the electronic controller 72 starts the process and proceeds to step S81 of the flowchart shown in FIG. 10. Upon completion of the flowchart shown in FIGS. 10 and 11, the electronic controller 72 repeats the process from step S81 in predetermined cycles until the supply of electric power is stopped.

In step S81, the electronic controller 72 determines whether the control state is the first control state. In step S81, in a case where the control state is the first control state, the electronic controller 72 proceeds to step S82. In step S82, the electronic controller 72 determines whether the kinetic state is the first kinetic state. In step S82, in a case where the kinetic state is the first kinetic state, the electronic controller 72 proceeds to step S83.

In step S83, the electronic controller 72 determines whether the human-powered vehicle 10 is in the riding converging state. In step S83, the electronic controller 72 determines the riding converging state through the processes shown in FIGS. 3 and 4. In a case where the human-powered vehicle 10 is not in the riding converging state, the electronic controller 72 proceeds to step S85. In step S83, in a case where the human-powered vehicle 10 is in the riding converging state, the electronic controller 72 proceeds to step S84.

In step S84, the electronic controller 72 changes the third shifting condition in accordance with the converging reference value CRVX and then proceeds to step S85. In step S85, the electronic controller 72 determines whether the third shifting condition is satisfied. In a case where the third shifting condition is not satisfied, the electronic controller 72 proceeds to step S87. In a case where the third shifting condition is satisfied, the electronic controller 72 proceeds to step S86. In step S86, the electronic controller 72 actuates the transmission device 42 to change the transmission ratio and then ends the process.

In step S87, the electronic controller 72 determines whether the operation portion 60 is operated. In step S87, in a case where the operation portion 60 is not operated, the electronic controller 72 ends the process.

In step S87, in a case where the operation portion 60 is operated, the electronic controller 72 proceeds to step S88. In step S88, the electronic controller 72 actuates the transmission device 42 to change the transmission ratio and then ends the process.

In step S82, in a case where the kinetic state is not the first kinetic state, the electronic controller 72 proceeds to step S89. In step S89, the electronic controller 72 determines whether the kinetic state is the second kinetic state. In step S89, in a case where the kinetic state is the second kinetic state, the electronic controller 72 proceeds to step S90.

In step S90, the electronic controller 72 determines whether the human-powered vehicle 10 is in the riding converging state. In step S90, the electronic controller 72 determines the riding converging state through the processes shown in FIGS. 3 and 4. In a case where the human-powered vehicle 10 is not in the riding converging state, the electronic controller 72 proceeds to step S92. In a case where the human-powered vehicle 10 is in the riding converging state, the electronic controller 72 proceeds to step S91.

In step S91, the electronic controller 72 changes the fourth shifting condition in accordance with the converging reference value CRVY and then proceeds to step S92. In step S92, the electronic controller 72 determines whether the fourth shifting condition is satisfied. In a case where the fourth shifting condition is not satisfied, the electronic controller 72 proceeds to step S94. In a case where the fourth shifting condition is satisfied, the electronic controller 72 proceeds to step S93. In step S93, the electronic controller 72 actuates the transmission device 42 to change the transmission ratio and then ends the process.

In step S94, the electronic controller 72 determines whether the operation portion 60 is operated. In step S94, in a case where the operation portion 60 is not operated, the electronic controller 72 ends the process.

In step S94, in a case where the operation portion 60 is operated, the electronic controller 72 proceeds to step S95. In step S95, the electronic controller 72 actuates the transmission device 42 to change the transmission ratio and then ends the process.

In step S89, in a case where the kinetic state is not the second kinetic state, the electronic controller 72 ends the process. The kinetic state can include, for example, a kinetic state that differs from the first kinetic state and the second kinetic state. In a case where the kinetic state includes a kinetic state that differ from the first kinetic state and the second kinetic state and a negative determination is made in step S89, the electronic controller 72 can determine whether the kinetic state is the kinetic state differing from the first kinetic state and the second kinetic state. In a case where it is determined that the kinetic state is the kinetic state differing from the first kinetic state and the second kinetic state, the electronic controller 72 can execute the same steps as steps S83 to S88 or steps S90 to S95. In a case where the kinetic state includes only the first kinetic state and the second kinetic state, step S89 can be omitted. In this case, in a case where it is determined in step S82 that the kinetic state is not the first kinetic state, the electronic controller 72 can proceed step S90.

Figure 11:
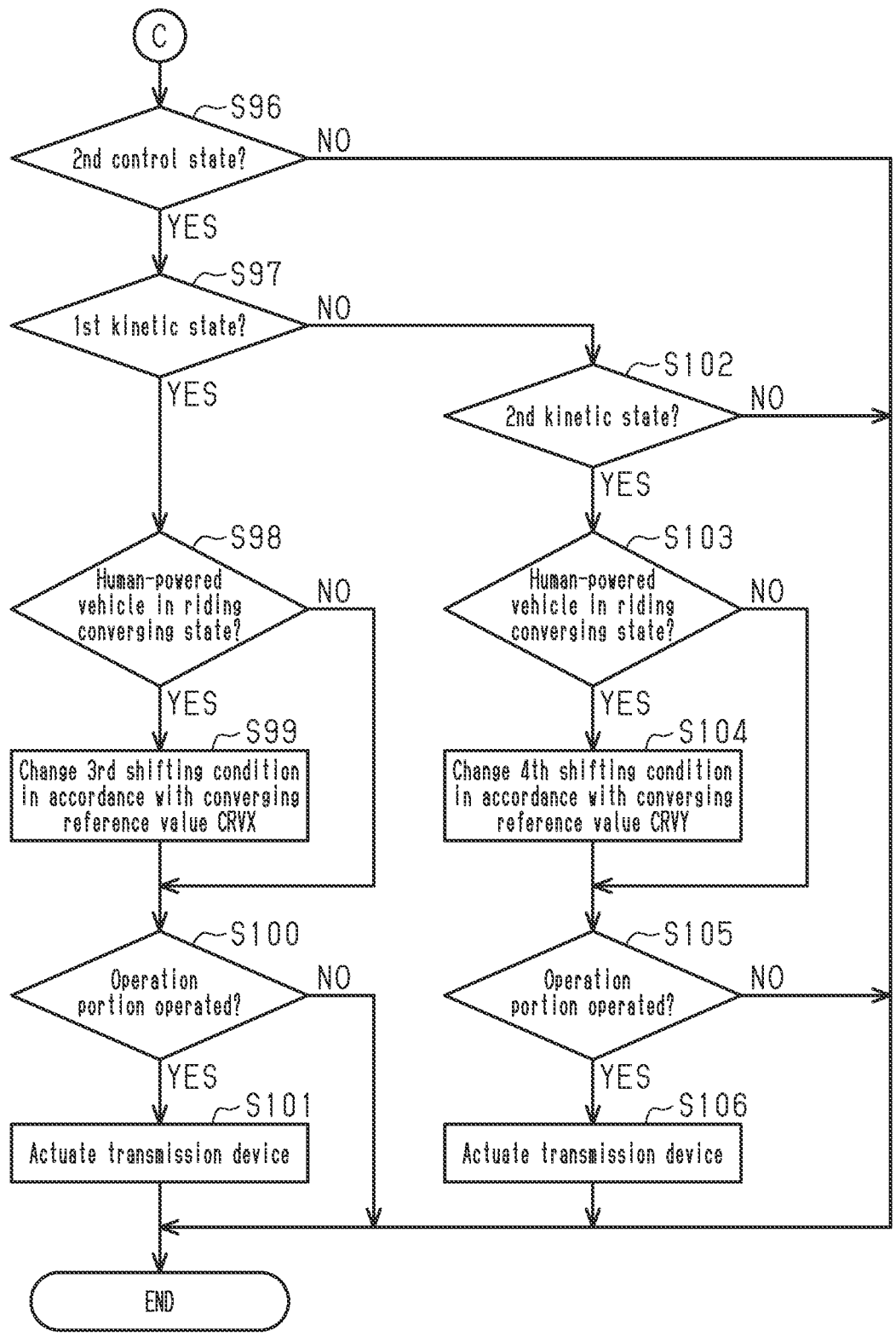
FIG. 11 is a flowchart showing an example of control executed by the electronic controller in accordance with the second embodiment.

In step S81, in a case where the control state is not the first control state, the electronic controller 72 proceeds to step S96 shown in FIG. 11. In step S96, the electronic controller 72 determines whether the control state is the second control state.

In step S96, in a case where the control state is the second control state, the electronic controller 72 proceeds to step S97. In step S97, the electronic controller 72 determines whether the kinetic state is the first kinetic state. In step S97, in a case where the kinetic state is the first kinetic state, the electronic controller 72 proceeds to step S98.

In step S98, the electronic controller 72 determines whether the human-powered vehicle 10 is in the riding converging state. In step S98, the electronic controller 72 determines the riding converging state through the processes shown in FIGS. 3 and 4. In step S98, in a case where the human-powered vehicle 10 is not in the riding converging state, the electronic controller 72 proceeds to step S100. In step S98, in a case where the human-powered vehicle 10 is in the riding converging state, the electronic controller 72 proceeds to step S99.

In step S99, the electronic controller 72 changes the third shifting condition in accordance with the converging reference value CRVX and then proceeds to step S100. In step S100, the electronic controller 72 determines whether the operation portion 60 is operated. In step S100, in a case where the operation portion 60 is not operated, the electronic controller 72 ends the process.

In step S100, in a case where the operation portion 60 is operated, the electronic controller 72 proceeds to step S101. In step S101, the electronic controller 72 actuates the transmission device 42 to change the transmission ratio and then ends the process.

In step S97, in a case where the kinetic state is not the first kinetic state, the electronic controller 72 proceeds to step S102. In step S102, the electronic controller 72 determines whether the kinetic state is the second kinetic state. In step S102, in a case where the kinetic state is the second kinetic state, the electronic controller 72 proceeds to step S103.

In step S103, the electronic controller 72 determines whether the human-powered vehicle 10 is in the riding converging state. In step S103, the electronic controller 72 determines the riding converging state through the processes shown in FIGS. 3 and 4. In step S103, in a case where the human-powered vehicle 10 is not in the riding converging state, the electronic controller 72 proceeds to step S105. In a case where the human-powered vehicle 10 is in the riding converging state, the electronic controller 72 proceeds to step S104.

In step S104, the electronic controller 72 changes the fourth shifting condition in accordance with the converging reference value CRVY and then proceeds to step S105. In step S105, the electronic controller 72 determines whether the operation portion 60 is operated. In step S105, in a case where the operation portion 60 is not operated, the electronic controller 72 ends the process.

In step S105, in a case where the operation portion 60 is operated, the electronic controller 72 proceeds to step S106. In step S106, the electronic controller 72 actuates the transmission device 42 to change the transmission ratio and then ends the process.

In step S102, in a case where the control state is not the second mode, the electronic controller 72 ends the process. In a case where the kinetic state includes a kinetic state that differ from the first kinetic state and the second kinetic state and a negative determination is made in step S102, the electronic controller 72 can determine whether the kinetic state is the kinetic state differing from the first kinetic state and the second kinetic state. In a case where the kinetic state is the kinetic state differing from the first kinetic state and the second kinetic state, the electronic controller 72 can execute the same steps as steps S98 to S101 or steps S103 to S106. In a case where the kinetic state includes only the first kinetic state and the second kinetic state, step S102 can be omitted. In this case, in a case where it is determined in step S97 that the kinetic state is not the first kinetic state, the electronic controller 72 can proceed step S103.

In step S96, in a case where the control state is not the second control state, the electronic controller 72 ends the process. The control state can include a control state that differs from the first control state and the second control state. In a case where the control state includes a control state that differs from the first control state and the second control state and a negative determination is made in step S96, the electronic controller 72 can determine whether the control state is the control state differing from the first control state and the second control state. In a case where the control state is the control state differing from the first control state and the second control state, the electronic controller 72 can execute the same steps as steps S82 to S95 or steps S97 to S106. In a case where the control state includes only the first control state and the second control state, step S96 can be omitted. In this case, in a case where it is determined in step S81 that the control state is not the first control state, the electronic controller 72 can proceed to step S97.

Third Embodiment

Figure 12:
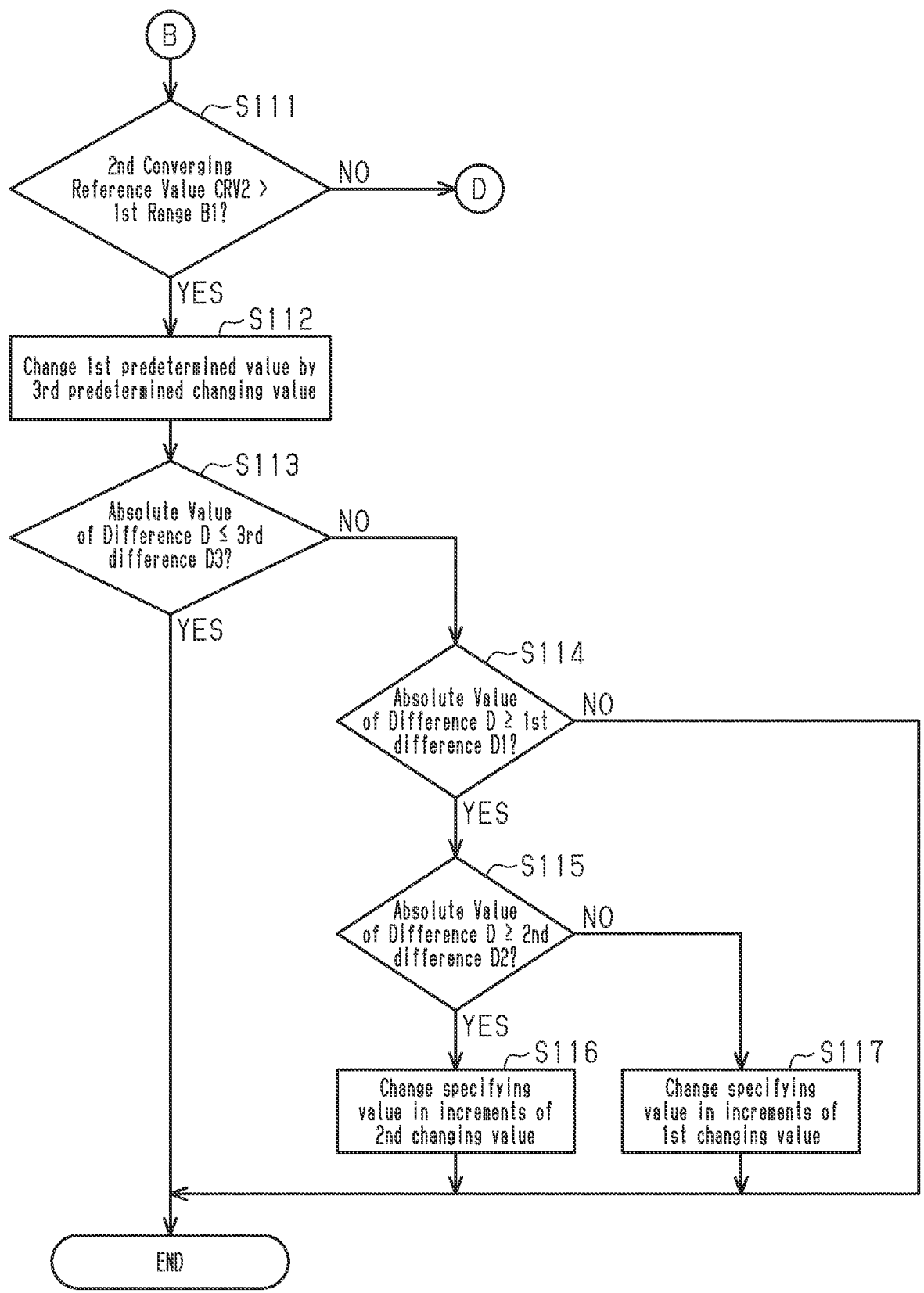
FIG. 12 is a flowchart showing an example of a shifting condition changing process executed by an electronic controller in accordance with a third embodiment.

A third embodiment of a human-powered vehicle control device 70 will now be described with reference to FIGS. 8, 12, and 13. The human-powered vehicle control device 70 of the third embodiment and the human-powered vehicle control devices 70 of the first and second embodiments have common configurations. Same reference characters are given to those configurations that are common to the first and second embodiments. Such configurations will not be described in detail.

The electronic controller 72 can vary the second predetermined value between a case where the second converging reference value CRV2 is greater than the first range B1 and a case where the second converging reference value CRV2 is less than the first range B1. The second predetermined value for a case where the second converging reference value CRV2 is greater than the first range B1 is a third predetermined value. The second predetermined value for a case where the second converging reference value CRV2 is less than the first range B1 is a fourth predetermined value. Preferably, the third predetermined value is a negative value, and the fourth predetermined value is a positive value.

For example, in a case where the first reference value RV1 is a cadence of the crank 24 and the second reference value RV2 is a torque applied to the crank 24 by a human driving force, if the converging value of the torque, that is, the second converging reference value CRV2, is greater than the first range B1, the electronic controller 72 decreases the first predetermined value, which is used for comparison with the first converging reference value CRV1 and corresponds to the cadence. In other words, in a case where the torque is large, the electronic controller 72 compares the first predetermined value that is relatively small with the first converging reference value CRV1.

For example, in a case where the first reference value RV1 is a cadence of the crank 24 and the second reference value RV2 is a torque applied to the crank 24 by a human driving force, if the converging value of the torque, that is, the second converging reference value CRV2, is less than the first range B1, the electronic controller 72 increases the first predetermined value, which is used for comparison with the first converging reference value CRV1 and corresponds to the cadence. In other words, in a case where the torque is small, the electronic controller 72 compares the first predetermined value that is relatively large with the first converging reference value CRV1.

In a case where the predetermined range corresponds to the cadence, it is preferred that the third predetermined value is greater than or equal to −15 rpm and less than or equal to 0 rpm. More preferably, the third predetermined value is greater than or equal to −13 rpm and less than or equal to −2 rpm. More preferably, the third predetermined value is greater than or equal to −8 rpm and less than or equal to −4 rpm. In a case where the predetermined range corresponds to the cadence, the third predetermined value is, for example, −6 rpm.

In a case where the predetermined range corresponds to the cadence, it is preferred that the fourth predetermined value is greater than or equal to 0 rpm and less than or equal to 15 rpm. More preferably, the fourth predetermined value is greater than or equal to 2 rpm and less than or equal to 13 rpm. More preferably, the fourth predetermined value is greater than or equal to 4 rpm and less than or equal to 8 rpm. In a case where the predetermined range corresponds to the cadence, the fourth predetermined value is, for example, 6 rpm.

An example of a process for changing the shifting condition executed by the electronic controller 72 shown in FIG. 2 will now be described with reference to FIGS. 8, 12, and 13. In a case where the electronic controller 72 is supplied with electric power, the electronic controller 72 starts the process and proceeds to step S61 of the flowchart shown in FIG. 8. Upon completion of the flowchart shown in FIGS. 8, 12, and 13, the electronic controller 72 repeats the process from step S61 in predetermined cycles until the supply of electric power is stopped.

In step S61, the electronic controller 72 determines whether the second converging reference value CRV2 is included in the first range B1. In a case where the second converging reference value CRV2 is included in the first range B1, the electronic controller 72 proceeds to step S62. In a case where the second converging reference value CRV2 is excluded from the first range B1, the electronic controller 72 proceeds to step S111 shown in FIG. 12.

In step S111, the electronic controller 72 determines whether the second converging reference value CRV2 is greater than the first range B1. In step S111, in a case where the second converging reference value CRV2 is greater than the first range B1, the electronic controller 72 proceeds to step S112.

In step S112, the electronic controller 72 changes the first predetermined value by the third predetermined value and then proceeds to step S113.

In step S113, the electronic controller 72 determines whether the absolute value of the difference D is included in the third difference D3. In step S113, in a case where the absolute value of the difference D is included in the third difference D3, the electronic controller 72 ends the process. In step S113, in a case where the absolute value of the difference D is greater than the third difference D3, the electronic controller 72 proceeds to step S114.

In step S114, the electronic controller 72 determines whether the absolute value of the difference D is greater than or equal to the first difference D1. In step S114, in a case where the absolute value of the difference D is less than the first difference D1, the electronic controller 72 ends the process.

In step S114, in a case where the absolute value of the difference D is greater than or equal to the first difference D1, the electronic controller 72 proceeds to step S115. In step S115, the electronic controller 72 determines whether the absolute value of the difference D is greater than or equal to the second difference D2.

In step S115, in a case where the absolute value of the difference D is greater than or equal to the second difference D2, the electronic controller 72 proceeds to step S116. In step S116, the electronic controller 72 changes the specifying value in increments of the second changing value and then ends the process.

In step S115, in a case where the absolute value of the difference D is less than the second difference D2, the electronic controller 72 proceeds to step S117. In step S117, the electronic controller 72 changes the specifying value in increments of the first changing value and then ends the process.

Figure 13:
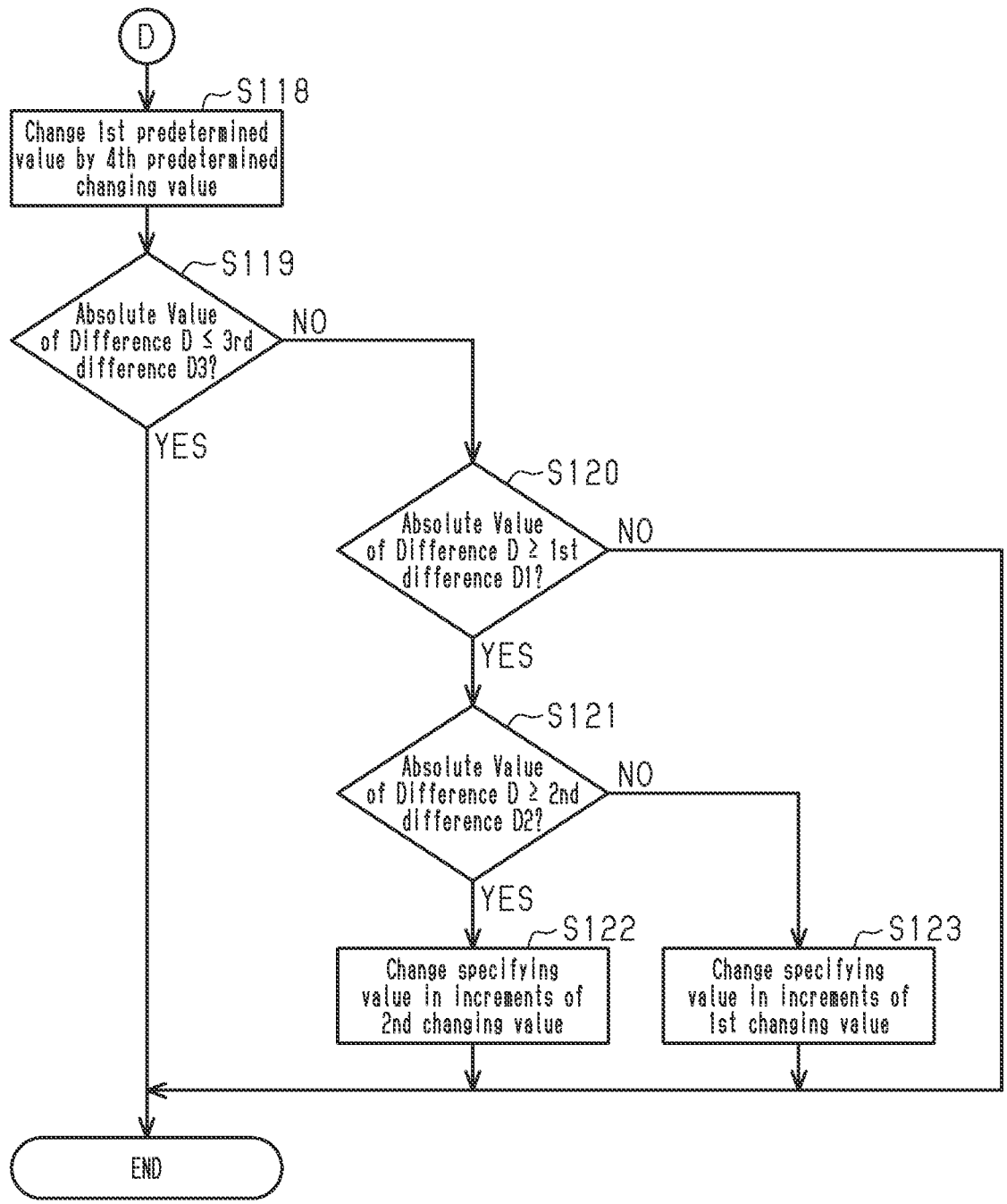
FIG. 13 is a flowchart showing an example of a shifting condition changing process executed by the electronic controller in accordance with the third embodiment.

In step S111, in a case where the second converging reference value CRV2 is less than the first range B1, the electronic controller 72 proceeds to step S118 shown in FIG. 13. In step S118, the electronic controller 72 changes the first predetermined value by the fourth predetermined value and then proceeds to step S119.

In step S119, the electronic controller 72 determines whether the absolute value of the difference D is included in the third difference D3. In step S119, in a case where the absolute value of the difference D is included in the third difference D3, the electronic controller 72 ends the process. In step S119, in a case where the absolute value of the difference D is greater than the third difference D3, the electronic controller 72 proceeds to step S120.

In step S120, the electronic controller 72 determines whether the absolute value of the difference D is greater than or equal to the first difference D1. In step S120, in a case where the absolute value of the difference D is less than the first difference D1, the electronic controller 72 ends the process.

In step S120, in a case where the absolute value of the difference D is greater than or equal to the first difference D1, the electronic controller 72 proceeds to step S121. In step S121, the electronic controller 72 determines whether the absolute value of the difference D is greater than or equal to the second difference D2.

In step S121, in a case where the absolute value of the difference D is greater than or equal to the second difference D2, the electronic controller 72 proceeds to step S122. In step S122, the electronic controller 72 changes the specifying value in increments of the second changing value and then ends the process.

In step S121, in a case where the absolute value of the difference D is less than the second difference D2, the electronic controller 72 proceeds to step S123. In step S123, the electronic controller 72 changes the specifying value in increments of the first changing value and then ends the process.

Modifications

The description related to the above embodiments exemplifies, without any intention to limit, applicable forms of a human-powered vehicle control device according to the present disclosure. The human-powered vehicle control device according to the present disclosure can be applied to, for example, modifications of the embodiments that are described below and combinations of at least two of the modifications that do not contradict each other. In the modifications described hereinafter, same reference characters are given to those elements that are the same as the corresponding elements of the above embodiment. Such elements will not be described in detail.

Figure 14:
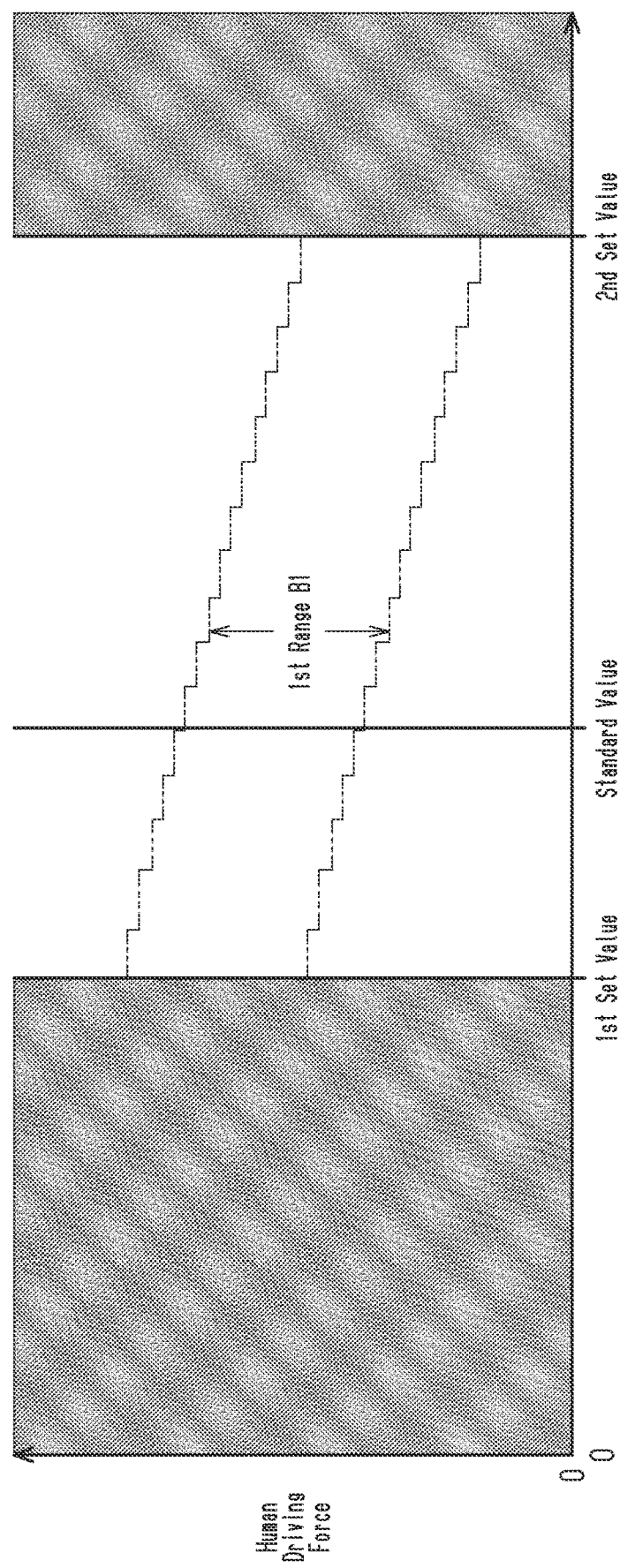
FIG. 14 is a map used in a shifting condition changing process executed by a human-powered vehicle control device in accordance with a modification.

The electronic controller 72 can change the first range B1 in accordance with the second converging reference value CRV2. A process for changing the first range B1 in accordance with the second converging reference value CRV2 with the electronic controller 72 will now be described with reference to FIG. 14. In FIG. 14, the upper limit value and the lower limit value of the first range B1 are indicated by double-dashed lines. A set value is a value that sets the first range B1. The set value is set to a standard value, for example, at a point in time where the human-powered vehicle 10 starts to travel. In a case where the set value is the standard value, the first range B1 is, for example, greater than or equal to 15 Nm and less than or equal to 40 Nm. As the set value increases, the upper limit value and the lower limit value of the first range B1 decrease. In a case where the second converging reference value CRV2 is greater than or equal to the standard value, the electronic controller 72 increases the set value to decrease the upper limit value and the lower limit value of the first range B1. In a case where the second converging reference value CRV2 is less than the standard value, the electronic controller 72 decreases the set value to increase the upper limit value and the lower limit value of the first range B1. Preferably, the electronic controller 72 sets the set value not to be less than a first set value. The first set value is, for example, less than the standard value by 5 Nm. Preferably, the electronic controller 72 sets the set value not to be greater than a second set value. The second set value is, for example, greater than the standard value by 10 Nm.

The shifting condition can be provided for each transmission ratio. For example, in a case where the transmission device 42 is configured to change the transmission ratio in a stepped manner, the shifting condition can vary in accordance with the step of the transmission ratio.

The electronic controller 72 can be configured to control the component 50 in a control state including three or more modes. In this case, at least one of the first mode and the second mode can include multiple modes. Preferably, the electronic controller 72 is configured to control the component 50 in accordance with each of the three or more modes.

In the first embodiment, the shifting condition can be set for each kinetic state of the human-powered vehicle 10. In this case, for example, the first shifting condition is set to differ for each kinetic state in the first mode, and the second shifting condition is set to differ for each kinetic state in the second mode. For example, in a case where the control state is the first mode and is the first kinetic state in the first control state, the electronic controller 72 changes the transmission ratio in accordance with a first-first shifting condition. For example, in a case where the control state is the first mode and is the second kinetic state in the first control state, the electronic controller 72 changes the transmission ratio in accordance with a first-second shifting condition. For example, in a case where the control state is the second mode and is the first kinetic state in the first control state, the electronic controller 72 changes the transmission ratio in accordance with a second-first shifting condition. For example, in a case where the control state is the second mode and is the second kinetic state in the first control state, the electronic controller 72 changes the transmission ratio in accordance with a second-second shifting condition. The electronic controller 72 changes each shifting condition, which corresponds to a mode and a kinetic state, in accordance with the converging reference value CRV for the mode and the kinetic state corresponding to the shifting condition.

The electronic controller 72 can be configured to change the shifting condition in accordance with the converging reference value CRV for the first control state and not to change the shifting condition in accordance with the converging reference value CRV for the second control state.

The electronic controller 72 can be configured to change the shifting condition in accordance with the converging reference value CRV for the second control state and not to change the shifting condition in accordance with the converging reference value CRV for the first control state.

In the first mode and the second mode, the electronic controller 72 can be configured to control the transmission device 42 to change the transmission ratio in accordance with the same shifting condition.

The component 50 can include at least one of the battery 40, an adjustable seatpost, and an anti-lock brake system (ABS). In a case where the component 50 includes the battery 40, for example, the power consumption amount of the battery 40 is changed in accordance with the first mode and the second mode. In a case where the component 50 includes an adjustable seatpost, for example, the height of the saddle is changed in accordance with the first mode and the second mode. In a case where the component 50 includes an ABS, for example, braking force of a brake device is changed in accordance with the first mode and the second mode.

The electronic controller 72 can be configured to change the shifting condition in accordance with a comfort level of the rider. The electronic controller 72 can be configured to change the shifting condition in accordance with a comfort level of the rider that is input by operating a first operation portion 62 indicated by broken lines in FIG. 2. In this case, the first operation portion 62 is provided, for example, on the handlebar 20 of the human-powered vehicle 10. The electronic controller 72 can be configured to change the shifting condition in accordance with an output of a detector 64 configured to detect the comfort level of the rider and is indicated by broken lines in FIG. 2. The detector 64 configured to detect a comfort level of the rider detects at least one of a face image or biometric information of the rider of the human-powered vehicle 10 to estimate the comfort level of the rider. The biometric information includes, for example, heart rate, muscle potential, and electroencephalogram of the rider. For example, in a case where the comfort level of the rider is suitable for the rider, the electronic controller 72 changes the predetermined changing value in accordance with the reference value RV for the case. For example, in a case where the comfort level of the rider is suitable for the rider, the electronic controller 72 changes the predetermined range in accordance with the reference value RV corresponding to the case.

In a case where the control state is the first control state, the electronic controller 72 can be configured to change the shifting condition in accordance with an operation performed on the operation portion 60. For example, in a case where the control state is the first control state and the upshifting operation portion is operated, the electronic controller 72 changes the shifting condition to decrease the specifying value of the predetermined range. For example, in a case where the control state is the first control state and the downshifting operation portion is operated, the electronic controller 72 changes the shifting condition to increase the specifying value of the predetermined range.

The electronic controller 72 is configured to change the shifting condition in accordance with an operation performed on a second operation portion 66 indicated by broken lines shown in FIG. 2. The second operation portion 66 can be provided on the human-powered vehicle 10 or an external device. The electronic controller 72 changes, for example, the predetermined range in accordance with an operation performed on the second operation portion 66. For example, before the human-powered vehicle 10 starts to travel, the rider operates the second operation portion 66 to change the predetermined range.

The shifting condition can include the second reference value RV2. The shifting condition is satisfied in a case where the second reference value RV2 is excluded from the predetermined range. Preferably, the shifting condition is satisfied in a case where torque applied by human driving force is excluded from the predetermined range.

In this specification, the phrase "at least one of" as used in this disclosure means "one or more" of a desired choice. As one example, the phrase "at least one of" as used in this disclosure means "only one choice" or "both of two choices" in a case where the number of choices is two. In another example, in this specification, the phrase "at least one of" as used in this disclosure means "only one single choice" or "any combination of equal to or more than two choices" if the number of its choices is equal to or more than three.

What is claimed is:

1. A human-powered vehicle control device for a human-powered vehicle including a transmission device that changes a transmission ratio, which is a ratio of a rotational speed of a wheel to a rotational speed of a crank axle, the human-powered vehicle control device comprising:
    an electronic controller configured to control the transmission device,
    the electronic controller being configured to actuate the transmission device to change the transmission ratio in accordance with a shifting condition including a first shifting condition and a second shifting condition,
    the electronic controller being configured to control a component of the human-powered vehicle in accordance with a control state including a first mode and a second mode that differs from the first mode,
    the electronic controller being configured to actuate the transmission device to change the transmission ratio in accordance with the first shifting condition in a case where the control state is the first mode,
    the electronic controller being configured to actuate the transmission device to change the transmission ratio in accordance with the second shifting condition in a case where the control state is the second mode,
    the electronic controller being configured to change the first shifting condition in accordance with a converging reference value, which is a reference value related to a traveling state of the human-powered vehicle, for a case where the control state is the first mode and the human-powered vehicle is in a riding converging state, and
    the electronic controller being configured to change the second shifting condition in accordance with a converging reference value, which is the reference value, for a case where the control state is the second mode and the human-powered vehicle is in the riding converging state.

2. The human-powered vehicle control device according to claim 1, wherein
    the component includes a motor that applies a propulsion force to the human-powered vehicle, and
    the first mode and the second mode differ from each other in at least one of an assist level of the motor, a maximum value of an output of the motor, the output of the motor, and a response speed of the output of the motor with respect to a human driving force input to the human-powered vehicle.

3. The human-powered vehicle control device according to claim 1, wherein
    the component includes the transmission device.

4. The human-powered vehicle control device according to claim 1, wherein
    the electronic controller is configured to switch the first mode and the second mode in accordance with at least one of model of the human-powered vehicle and a size of a wheel of the human-powered vehicle.

5. The human-powered vehicle control device according to claim 1, wherein
the shifting condition is set for each kinetic state of the human-powered vehicle.

6. A human-powered vehicle control device for a human-powered vehicle including a transmission device that changes a transmission ratio, which is a ratio of a rotational speed of a wheel to a rotational speed of a crank axle, the human-powered vehicle control device comprising:
an electronic controller configured to control the transmission device, wherein
the electronic controller being configured to actuate the transmission device to change the transmission ratio in accordance with a shifting condition including a third shifting condition and a fourth shifting condition,
the electronic controller being configured to actuate the transmission device to change the transmission ratio in accordance with the third shifting condition in a case where a kinetic state of the human-powered vehicle is a first kinetic state,
the electronic controller being configured to actuate the transmission device to change the transmission ratio in accordance with the fourth shifting condition in a case where the kinetic state of the human-powered vehicle is a second kinetic state that differs from the first kinetic state,
the electronic controller being configured to change the third shifting condition in accordance with a converging reference value, which is a reference value related to a traveling state of the human-powered vehicle, for a case where the kinetic state of the human-powered vehicle is the first kinetic state and the human-powered vehicle is in a riding converging state, and
the electronic controller being configured to change the fourth shifting condition in accordance with a converging reference value, which is the reference value, for a case where the kinetic state of the human-powered vehicle is the second kinetic state and the human-powered vehicle is in the riding converging state.

7. The human-powered vehicle control device according to claim 5, wherein
the kinetic state includes a human driving force input to the human-powered vehicle.

8. The human-powered vehicle control device according to claim 5, wherein
the kinetic state includes a tilt of the human-powered vehicle.

9. The human-powered vehicle control device according to claim 8, wherein
the electronic controller is configured to change the shifting condition in accordance with a parameter related to the tilt of the human-powered vehicle, and
the parameter includes at least one of an acceleration of the human-powered vehicle, a pitch angle of the human-powered vehicle, a roll angle of the human-powered vehicle, and a yaw angle of the human-powered vehicle.

10. The human-powered vehicle control device according to claim 1, wherein
the electronic controller is configured to change the shifting condition in accordance with a comfort level of a rider.

11. The human-powered vehicle control device according to claim 10, wherein
the electronic controller is configured to change the shifting condition in accordance with the comfort level of the rider that is input by operating a first operation portion.

12. The human-powered vehicle control device according to claim 10, wherein
the electronic controller is configured to change the shifting condition in accordance with an output of a detector that detects the comfort level of the rider.

13. The human-powered vehicle control device according to claim 1, wherein
the electronic controller is configured to change the shifting condition in a case where a second operation portion is operated.

14. The human-powered vehicle control device according to claim 1, wherein
the converging reference value includes a first converging reference value and a second converging reference value, which is related to a force applied to a crank of the human-powered vehicle in a case where the human-powered vehicle is in a riding converging state, and
the electronic controller is configured to change the shifting condition in accordance with the first converging reference value and the second converging reference value.

15. The human-powered vehicle control device according to claim 1, wherein
the electronic controller is configured to calculate the converging reference value in accordance with a moving average or variance of the reference value.

16. The human-powered vehicle control device according to claim 1, wherein
the reference value includes a value related to a rotational speed of the crank axle.

17. The human-powered vehicle control device according to claim 16, wherein
the value related to the rotational speed of the crank axle includes a rotational amount of the crank axle or a rotational angle of the crank axle.

18. The human-powered vehicle control device according to claim 1, wherein
the shifting condition includes a value related to the rotational speed of the crank axle.

19. The human-powered vehicle control device according to claim 18, wherein
the shifting condition is satisfied in a case where the rotational speed of the crank axle is excluded from a predetermined range, and
the electronic controller is configured to change the predetermined range in accordance with the converging reference value to change the shifting condition.

20. The human-powered vehicle control device according to claim 1, wherein
the case where the human-powered vehicle is in the riding converging state is a case where the rotational speed of the crank axle is included in a first range.

21. The human-powered vehicle control device according to claim 1, further comprising:
a storage configured to store information related to the shifting condition that has been changed.

* * * * *